March 14, 1961  F. R. WERNER ET AL  2,974,860
BALANCE TOTALIZER CONTROL MEANS FOR CASH
REGISTERS AND ACCOUNTING MACHINES
Filed March 9, 1956  7 Sheets-Sheet 1

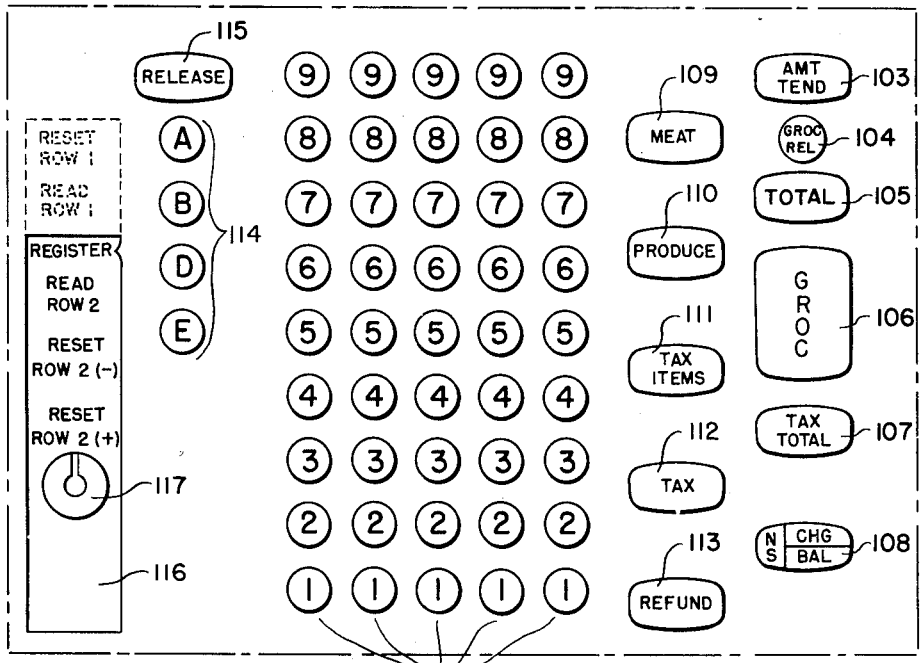

| WE APPRECIATE YOUR PATRONAGE | | |
|---|---|---|
| 031 | | 16 FEB 56 |
| A | 00.32 | GROC |
| A | 00.65 | MEAT |
| A | 00.44 | TAX ITEM |
| A | 00.64 | PROD |
| A | 01.52 | MEAT |
| A | 00.32 | TAX ITEM |
| A | 00.03 | TAX |
| A | 03.92 | TOTL |
| A | 00.12 | RE FUND |
| A | 03.80 | TOTL |
| A | 05.00 | AMT TEND |
| A | 01.20 | CHNG |
| YOUR RECEIPT THANK YOU | | |

FIG. 3

| 031 | A00001.20 | CHNG |
|---|---|---|
| 031 | A00005.00 | AMT TEND |
| 031 | A00003.80 | TOTL |
| 031 | A00003.92 | TOTL |
| 031 | A00000.76 | TAX TOTL |

INVENTORS
FRANK R. WERNER
JOHN M. JACKSON
ROBERT F. WOOSTER
KENNETH C. FLINT &
CHARLES W. TOPPER

BY *Kearl Beust*

*Albert L. Sessler Jr.*

THEIR ATTORNEYS

March 14, 1961   F. R. WERNER ET AL   2,974,860
BALANCE TOTALIZER CONTROL MEANS FOR CASH
REGISTERS AND ACCOUNTING MACHINES
Filed March 9, 1956   7 Sheets-Sheet 2

INVENTORS
FRANK R. WERNER
JOHN M. JACKSON
ROBERT F. WOOSTER
KENNETH C. FLINT &
CHARLES W. TOPPER

BY
THEIR ATTORNEYS

March 14, 1961 F. R. WERNER ET AL 2,974,860
BALANCE TOTALIZER CONTROL MEANS FOR CASH
REGISTERS AND ACCOUNTING MACHINES
Filed March 9, 1956 7 Sheets-Sheet 3

INVENTORS
FRANK R. WERNER
JOHN M. JACKSON
ROBERT F. WOOSTER
KENNETH C. FLINT &
CHARLES W. TOPPER

BY Hearl Beust
Albert L. Sessler, Jr.
THEIR ATTORNEYS

March 14, 1961  F. R. WERNER ET AL  2,974,860
BALANCE TOTALIZER CONTROL MEANS FOR CASH
REGISTERS AND ACCOUNTING MACHINES
Filed March 9, 1956  7 Sheets-Sheet 4

INVENTORS
FRANK R. WERNER
JOHN M. JACKSON
ROBERT F. WOOSTER
KENNETH C. FLINT &
CHARLES W. TOPPER

BY *Earl Beust*
*Albert L. Sensley Jr.*

THEIR ATTORNEYS

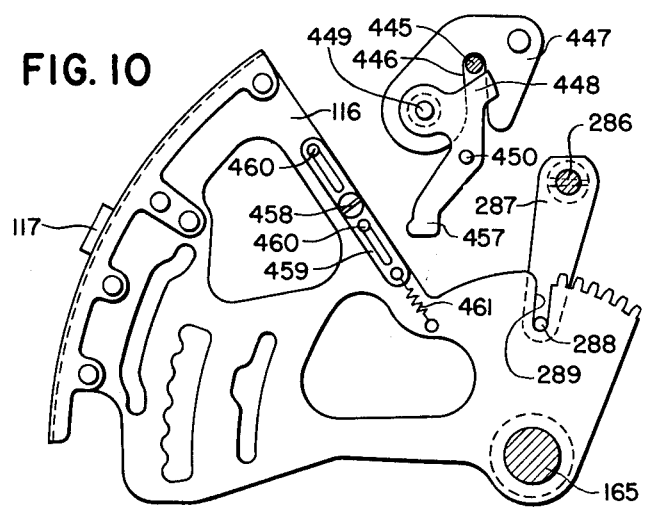
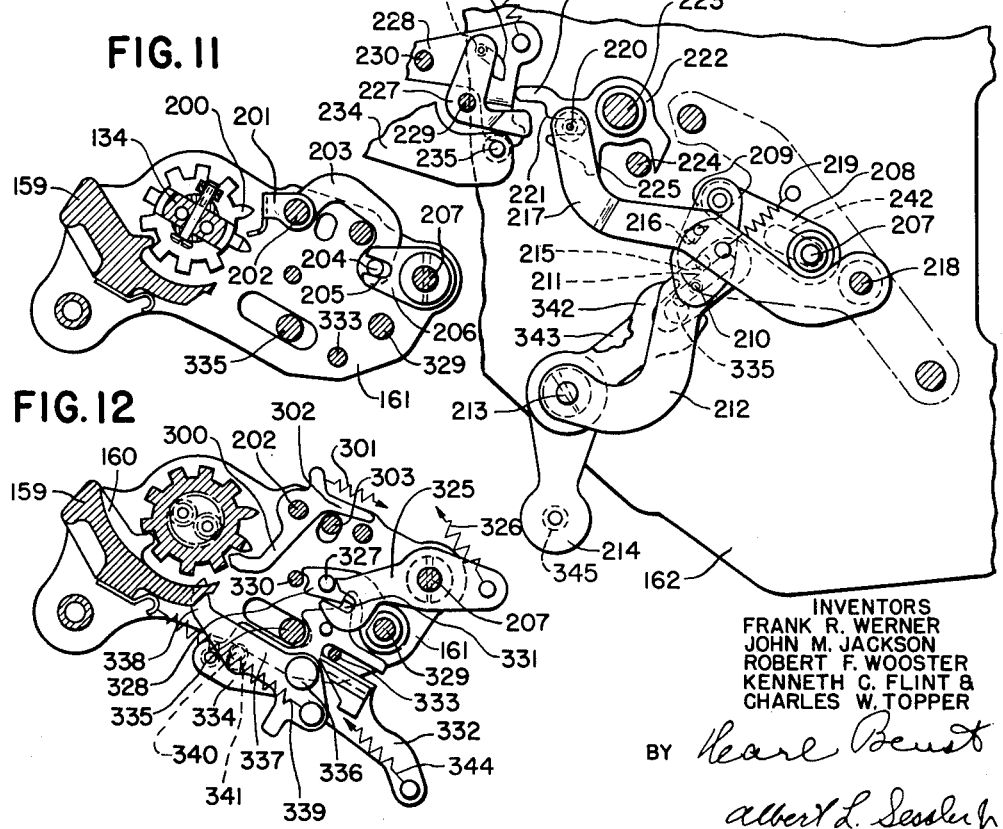

March 14, 1961

F. R. WERNER ET AL 2,974,860

BALANCE TOTALIZER CONTROL MEANS FOR CASH
REGISTERS AND ACCOUNTING MACHINES

Filed March 9, 1956

INVENTORS
FRANK R. WERNER
JOHN M. JACKSON
ROBERT F. WOOSTER
KENNETH C. FLINT &
CHARLES W. TOPPER

BY

THEIR ATTORNEYS

United States Patent Office 2,974,860
Patented Mar. 14, 1961

2,974,860

BALANCE TOTALIZER CONTROL MEANS FOR CASH REGISTERS AND ACCOUNTING MACHINES

Frank R. Werner, John M. Jackson, and Robert F. Wooster, Dayton, Kenneth C. Flint, West Carrollton, and Charles W. Topper, Centerville, Ohio, assignors to The National Cash Register Company, Dayton, Ohio, a corporation of Maryland Filed Mar. 9, 1956, Ser. No. 570,442

6 Claims. (Cl. 235—7)

This invention relates to improvements in totalizer equipment for cash registers and accounting machines, and particularly to means for effecting both addition and subtraction computations in such totalizer equipment.

The machine of the present invention is provided with a plurality of totalizers, including a balance totalizer with plus and minus sides or elements which are inter-connected for reverse rotation with respect to each other. Operating and control means are provided for selecting, shifting, and engaging the totalizers in accordance with the type of operation being performed by the machine.

The provision of mechanism capable of adding and subtracting computations in connection with the various accumulating means of a cash register or accounting machine adds greatly to the utility of such a machine. One example of the many uses to which a machine so equipped may be put is that of change computation. With a cash register equipped for change computation, the clerk in a retail establishment may enter and total the various items purchased by a customer, enter the amount of money which the customer tenders him, and depress an appropriate key on the machine, which will initiate operation of said machine to compute the amount of change due to the customer, or, if the customer has not tendered sufficient money, the amount remaining due. The machine may also print a receipt and/or a detail strip to provide a permanent record of each such transaction.

Another example of the use of the adding and subtraction feature is in the case of refunds due on bottle returns or special sale coupons, which are to be deducted from the total of the items purchased by the customer. Here also the machine will perform the necessary computation and provide a corrected total amount due. The uses of a cash register or accounting machine capable of subtracting as well as adding are, of course, not limited to the examples cited above, since many other important uses exist for such a machine.

It is, generally speaking, an object of this invention to provide a compact and efficient cash register of economical construction, having many of the appointments and features of larger and more costly machines.

An additional object is to provide an economically constructed cash register capable of carrying out both adding and subtracting operations.

A further object is the provision of an add-subtract or balance totalizer having plus and minus elements which are mounted on the same axial member and interconnected for rotation in opposite directions.

Another object is the provision of improved operating and control means for selecting and conditioning the balance totalizer for the desired type of operation.

Still a further object is the provision of a single control means which is capable of causing either an additive or a subtractive operation, depending upon the condition at that time of said means, and upon whether or not the amount concurrently entered in the machine causes an overdraft in the totalizer in which it is entered.

Still another object is the provision of means to enter a single corrective unit in a totalizer when the capacity of that totalizer is exceeded.

An additional object is the provision of improved means for locking the machine to prevent the operation thereof.

Another object is the provision of improved means for selectively controlling printing operations on the detail strip of a cash register.

A further object is the provision of an improved means for enforcing a predetermined sequence of operations of the cash register and of additional means for rendering the enforcing means ineffective.

With these and incidental objects in view, the invention includes certain novel features of construction and combinations of parts, a preferred form or embodiment of which is hereinafter described with reference to the drawings which accompany and form a part of this specification.

In the drawings:

Fig. 1 is a diagrammatic view of the keyboard of the machine embodying the present invention.

Fig. 2 is a facsimile of a multiple-item receipt issued by the machine.

Fig. 3 is a facsimile of a fragmentary portion of a detail strip prepared by the machine of this invention.

Fig. 10 is a detail view of the total control lever, sometimes referred to as the "unit lock lever," for controlling the various functions of the machine, and a portion of the release key mechanism which is operable to effect locking of the machine.

Fig. 11 is a detail view of a portion of the overdraft mechanism which is controlled by a long tooth in the highest denomination of the totalizers of the No. 1 totalizer line.

Fig. 12 is a detail view of the mechanism for entering a corrective unit to the lowest denomination of the totalizers of the No. 1 totalizer line when an overdraft occurs.

Fig. 13 is a detail view of a portion of the mechanism controlled by the overdraft mechanism of Fig. 11 for in turn controlling the positioning of one of the control detents.

The machine chosen to illustrate the present invention has many basic principles and features which are similar in many respects to those of a well-known type of cash register, which is fully disclosed in the following United States Patents: No. 1,816,263, issued July 28, 1931; No. 1,929,652, issued October 10, 1933; No. 2,048,200, issued July 21, 1936; and No. 2,056,485, issued October 6, 1936, all to William H. Robertson.

Reference may be had to the above listed patents for a history of the development of the pioneer machines of this type, and for a complete disclosure of those mechanisms used in the present machine which are similar to the corresponding mechanisms of the pioneer or basic machines, and which for that reason will be described only in general terms in the present application.

Likewise, the machine embodying the present invention is identical in its appearance and in many of its structural details to the machine disclosed in copending applications for Letters Patent of the United States, Serial No. 341,633, filed March 11, 1953, now United States Patent No. 2,880,930, issued April 7, 1959; Serial No. 412,464, filed February 25, 1954; and Serial No. 533,413, filed September 9, 1955, now United States Patent No. 2,800,854, issued July 30, 1957, all by Frank R. Werner, et al., inventors, to which reference may be had for a full disclosure of similar mechanism illustrated in the present application, and which will be described only in general terms, unless it is pertinent to the present invention.

Mechanism pertinent to the present invention will be fully described in the ensuing pages.

Machine in general and supporting framework

Figure 15:
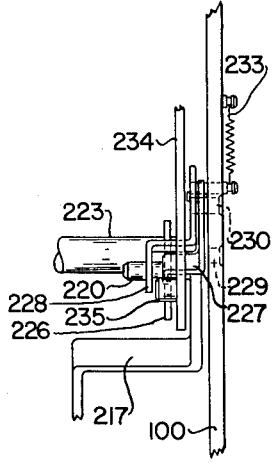
Fig. 15 is a side-spacing view of the mechanism of Fig. 14.

The mechanism of the machine is supported by a left side frame 101 (Fig. 4) and a corresponding right side frame 100 (Fig. 15) and by corresponding auxiliary frames (not shown) secured to the upper end of said right and left frames, which latter are in turn maintained in proper side-spaced relationship to each other by a base plate, a back plate and by various cross bars, plates, rods and shafts. The machine mechanism and framework is enclosed in a cabinet, secured to the top surface of a drawer cabinet which has mounted therein a cash drawer. This cash drawer opens automatically at the end of certain machine operations, and also may be opened manually by authorized persons having a key to a closure in the machine cabinet. For a detailed description of the parts of the machine mentioned above, reference may be had to the previously mentioned applications, Serial Nos. 341,633, now Patent No. 2,880,930, and 412,464.

The cabinet of the machine has a large opening in the front thereof to provide proper clearance for the machine keyboard. The keyboard of the present machine is shown in Fig. 1, and comprises five rows or denominational orders of amount keys 102, a row of No. 1 selecting or control keys 103 to 108 inclusive, a row of No. 2 selecting or control keys 109 to 113 inclusive, four Clerk's keys 114, and a Release key 115, for releasing any depressed key prior to the operation of the machine. The keyboard of the machine also includes a total control lever 116 often referred to as a "Unit Lock Lever," which is movable to various positions to control the various functions of the machine, said positions including "Register" position, "Read Row 1" position, "Reset Row 1" position, "Read Row 2" position, "Reset Row 2 (—)" position and "Reset Row 2 (+)" position. The total control lever 116 (Figs. 1 and 10) has incorporated therein a lock 117, which is provided with two keys, one of which permits the lever to be locked in any one of the "Register," "Read Row 1," or "Read Row 2" positions so that said lever may not be moved out of these positions by unauthorized persons not in possession of said key. The total control lever 116 is normally locked against movement into any one of the "Reset Row 1," "Reset Row 2 (—)" or "Reset Row 2 (+)" positions, and a special reset key is provided for the lock 117, for unlocking the lever so that it may be moved to any of these reset positions. It is therefore impossible for persons not in possession of a reset key to move the total control lever to any other reset position to clear the amount from any of the totalizers which are controlled by said lever 116. The register may be locked to prevent any operation whatsoever by first shifting the lever 116 either to "Read Row 1" or "Reset Row 1" position, then depressing the Release key 115 and holding it depressed, and finally shifting the lever 116 to register position. The operating mechanism for Release key 115 will then be held in a shifted position by means which will subsequently be disclosed, thereby locking the machine. To return the release key operating mechanism to its normal position and thus unlock the machine, the lever 116 is shifted to "Read Row 1" or "Reset Row 1" position, releasing the release key operating mechanism and permitting it to return to normal position. The machine is thereby unlocked for operation.

The two control rows are each provided with a differential mechanism, each of which is positioned by the keys in its row, the differential mechanism in turn controlling the positioning of corresponding front and back indicators (not shown) for indicating data relating to the corresponding keys. Likewise the control differential mechanisms are connected to and position corresponding type wheels for printing data relating thereto upon receipts 118 (Fig. 2) which are fed out of an opening in the machine cabinet, and for printing similar information on a detail strip 119, a portion of which is visible through an opening in the right hand side of the cabinet adjacent to the control keys. The front and rear indicators are visible through openings (not shown) in the upper portion of the front and back of the cabinet.

Like the control keys, each row of amount keys 102 is provided with a differential mechanism for positioning corresponding amount type wheels for printing amounts on the receipts 118 and the detail strip 119, and for positioning the corresponding front and rear indicators. The row of Clerk's keys 114 is also provided with a differential mechanism for positioning corresponding type wheels for printing identifying letters on the receipt and the detail strip.

The machine is normally operated by the usual type of electric motor, not shown, but fully disclosed in the application Serial No. 341,633, now Patent No. 2,880,930, referred to before. However, in emergencies the machine may be operated manually by means of a hand crank (not shown) which is inserted through an opening provided therefor in the closure which forms a part of the machine cabinet. A rockable shutter normally closes this opening.

The present machine is provided with two lines of interspersed totalizers. The No. 1 line has four sets of interspersed totalizer pinions or wheels thereon, two sets of which are interconnected so that rotation of one of the two sets in one direction will cause rotation of the other of said two sets in the opposite direction. The No. 2 line has five sets of interspersed totalizer wheels thereon. Both of said totalizer lines are shiftable laterally under control of their corresponding control keys to aline the selected totalizer thereon with the amount actuators, or differential mechanism, for actuation thereby. Likewise, the control keys, in conjunction with the total control lever 116, control the engaging and disengaging movement of the selected totalizer and the differential mechanism, for entering amounts in said selected totalizers and for the taking of totals therefrom. Each totalizer line is provided with a tens transfer mechanism for transferring tens digits from lower to higher denominations, and the lowest order of each of the two interconnecting totalizers is provided with a mechanism for entering a single unit correction, often referred to as a "fugitive one," thereto when the capacity of that totalizer is exceeded.

In addition to their other functions, the control keys 103 and 105 to 113 inclusive are what is termed in this art as motorized keys in that any one of these keys, when depressed, initiates operation of the machine.

In the ensuing pages, mechanism pertinent to the present invention will be described in detail. For a full disclosure of other mechanism of the machine, reference may be had to the patents and to the applications listed at the beginning of this specification.

*Detailed description—Amount keys and differential mechanisms therefor*

As explained previously, the present machine is provided with four rows of amount keys 102, and each row of amount keys is provided with a corresponding differential mechanism comprising primary and secondary differential members for transmitting the value of depressed keys to the indicating and printing mechanisms and for setting the wheels of the selected totalizer according to the value of said depressed amount key. Inasmuch as the several amount banks are similar in construction, and are fully disclosed in the application Serial No. 341,633, now Patent No. 2,880,930, it is believed that a general description of the amount bank, illustrated in Fig. 4, will adequately serve the present purpose.

Figure 4:
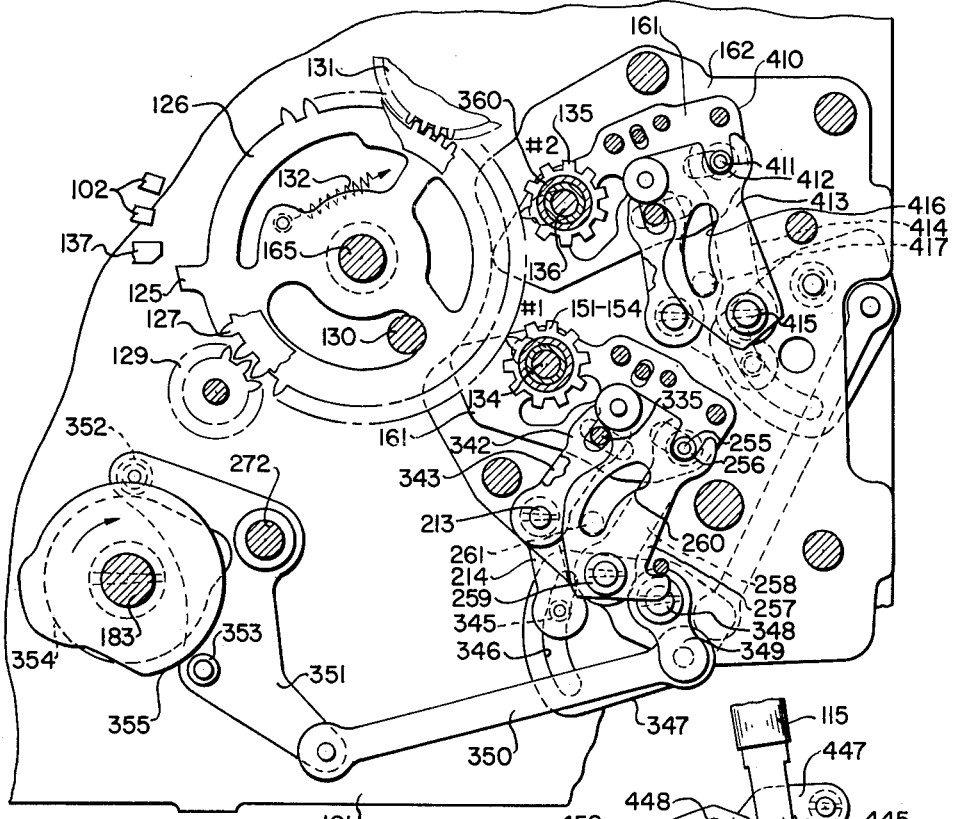
Fig. 4 is a right side elevation, showing the two totalizer lines and the amount differential mechanism for actuating the various sets of totalizers mounted thereon.

The amount keys 102, for the denominational order disclosed in Fig. 4, are slidably mounted in a key frame (not shown) in turn supported by rods (not shown) extending between the main frames. Depressing one of the amount keys 102 moves the lower end of the stem thereof into the path of a projection 125 on a primary differential member 126, which together with a companion secondary differential member 127 is freely supported on a shaft 165 journaled in the main frames of the machine. The primary and secondary differential members 126 and 127 are coupled together for concerted movement, at proper times, by a coupling pinion 129.

The primary and secondary differential members 126 and 127 are actuated by means of a universal rod 130, which extends through openings in said differential members and which oscillates first clockwise and then back to normal position (Fig. 4), to actuate the differential mechanism. Teeth in the upper edge of the secondary differential member 127 engage corresponding teeth in an idler gear 131, which meshes with the external teeth of an external-internal transmission gear (not shown), which transmits the positioning of the secondary differential member 127 to the corresponding type wheels and indicators, in the usual and well-known manner, as fully disclosed in the application, Serial No. 341,633, now Patent No. 2,880,930.

Initial movement clockwise of the universal rod 130 permits the primary member 126, under influence of a spring 132, to follow in unison therewith until the projection 125 strikes the lower end of the stem of the depressed amount key 102 to position said primary differential member 126 according to the value of said depressed amount key. After the primary differential member 126 has been positioned, as explained above, the universal rod 130 continues its initial movement to restore the secondary differential member 127 and the mechanism connected thereto, including the corresponding type wheels and indicators, to zero position. Prior to initial movement of the primary and secondary differential members 126 and 127, the coupling pinion 129 is disengaged therefrom, so that said members are free to move independently of each other to be positioned and restored, as explained above.

After the primary differential member 126 has been positioned according to the depressed amount key 102 and the secondary differential member 127 has been restored to zero the coupling pinion 129 is re-engaged with said members to couple them together, whereupon counter-clockwise return movement of the universal rod 130 carries the primary differential member 126 from its set position to zero or home position, against the tension of the spring 132, and positions the secondary member 127 in accordance therewith. The secondary differential member 127 in turn positions the corresponding type wheels and indicators in accordance with the value of the depressed amount key 102. Teeth in the periphery of the primary differential member 126 cooperate with similar teeth in the corresponding ones of four sets of totalizer wheels 151–154 (Fig. 4) mounted on a No. 1 or lower totalizer line 134, and with teeth in the corresponding ones of five sets of totalizer wheels 135, mounted on a No. 2 or upper totalizer line 136.

In adding operations, after the primary differential member 126 has been positioned under influence of the depressed amount key 102, as explained above, the corresponding wheels 151–154 and/or 135 of the selected totalizers are engaged with said primary differential member 126, and return movement thereof rotates said selected wheels a distance in an additive direction corresponding to the value of the depressed amount key, to enter said value in said wheels. After the primary differential member 126 has arrived in home or zero position, the selected totalizer wheels are disengaged therefrom.

When no amount key 102 is depressed in the denominational order shown in Fig. 4, and being described herein as representative of all the amount banks, a zero stop bar 137, slidably mounted in the key frame, is moved inwardly from normal ineffective position into the path of the projection 125 to obstruct movement of the primary differential member 126 away from home or zero position, said primary differential member in turn causing the corresponding secondary differential member 127 to be positioned in zero position to position the type wheels and indicators accordingly.

In sub-total and total taking operations, often referred to hereinafter as Read and Reset operations, the wheels 151–154 and/or 135 of the selected totalizer are engaged with the primary differential member 126 prior to its initial movement, which movement reversely rotates said wheel to zero position to position said primary differential member 126 according to the value of said wheel. Prior to positioning of the primary differential member 126 by the selected totalizer wheel, the coupling pinion 129 is disengaged, as explained above, to permit independent movement of said primary differential member 126 and the secondary differential member 127, said latter member being restored to zero position by the universal rod 130, as explained in connection with adding operations.

After the primary differential member 126 has been positioned by the selected totalizer wheel and the secondary differential member 127 has been restored to zero position, the coupling pinion 129 is engaged to couple said differential members for concerted movement, whereupon counter-clockwise return movement of the universal rod 130 returns the primary differential member 126 from set position to zero position and carries the secondary differential member 127 in unison therewith a like extent, to position the corresponding type wheels and indicators in accordance with the amount standing on the zeroized totalizer wheel. In reset operations, the wheel of the selected totalizer is disengaged from the primary differential member 126 prior to its counter-clockwise return movement, and consequently said wheel remains in zeroized condition. In reading operations, the wheel of the selected totalizer is re-engaged with the primary differential member 126 prior to its return movement and is restored thereby to its original position to preserve the total for further computation.

The depressed amount keys 102 (Fig. 1) are automatically released near the end of the adding operation and may be manually released by depression of the release key 115 in case it is desirable or necessary. The amount keys 102 are of flexible construction, in that depression of one amount key releases a previously depressed amount key in the same row and retains the latter depressed key in depressed position.

*Construction of No. 1 totalizer line*

Figure 7:
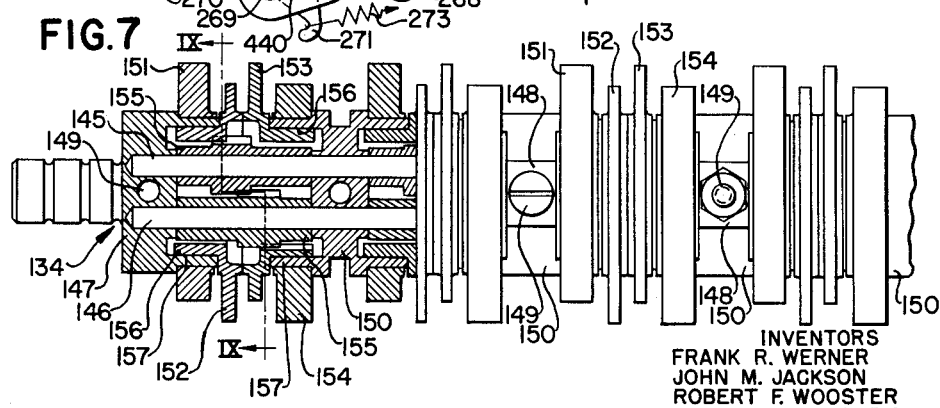
Fig. 7 is a detail view, partly in section, of the No. 1 totalizer line.
Figure 9:
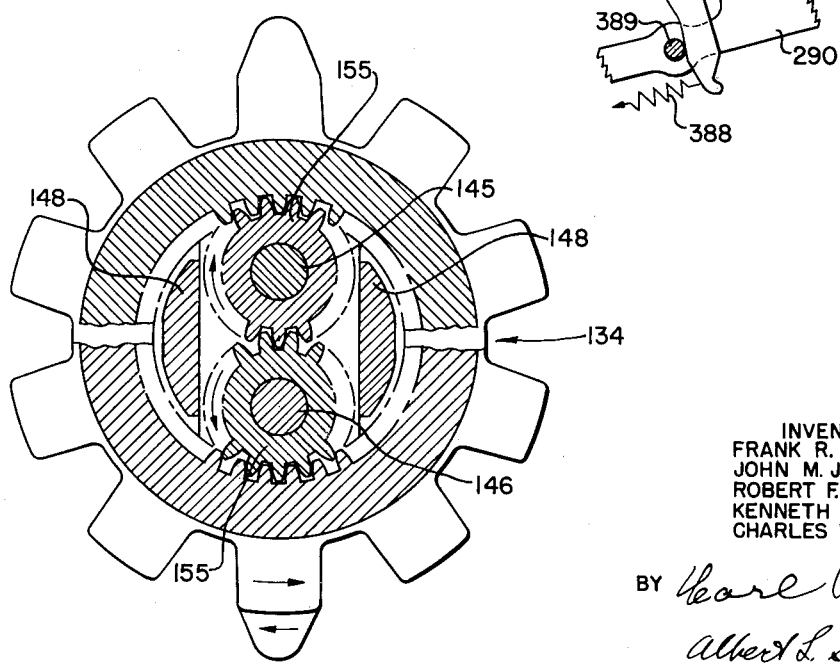
Fig. 9 is a sectional view, taken on line IX—IX of Fig. 7, of the No. 1 totalizer line.

The No. 1 totalizer line 134, shown particularly in Figs. 7 and 9, is supported chiefly by two parallel rods 145 and 146 extending substantially the length of said line. Said rods are secured at their ends in corresponding bores in the two end bearings 147, which support the totalizer line in the machine. Also extending between the two end bearings 147 are two bearing strips 148 bolted to the end bearings by bolts 149 whose longitudinal axes are at right angles to the plane which includes the longitudinal axes of the rods 145 and 146. Also bolted to the bearing strips at equally spaced intervals are bearings 150 which support the #1 totalizer wheels 151, 152, 153 and 154, which, assuming Fig. 7 to be viewed from the front of the machine, are respectively the Group totalizer, the Minus and Plus sides of the Balance totalizer, and the Taxable Itemizing totalizer. A drive pinion 155 is mounted free on each of the rods 145 and 146 between adjacent sets of bearings. The teeth on the pinions 155 are formed closer to one end of the pinion than the other, so that when the pinions are assembled on the rods 145 and 146 between adjacent bearing members, the gear teeth of said pinions will be in mesh, but will overhang each other, rather than being in exact registry.

The totalizer wheels 152 and 153 each have sleeve-like base portions which abut each other and which are provided with internal gear teeth adapted to mesh with the teeth of one of the drive pinions 155. Due to the previously mentioned overhang or offset positioning of the two meshing drive pinions 155, each of the totalizer wheels 152 and 153 meshes with one of a set of two meshing drive pinions without contacting the other of said set. The wheels 152 and 153 are also provided with bearing surfaces 156 which coact with corresponding internal bearing surfaces 157 on the bearing members 147 and 150 to position said totalizer wheels 152 and 153 properly. It will be seen that due to the gear arrangement of the totalizer wheels 152 and 153, and the drive pinions 155, rotation of one of the totalizer wheels 152 in one direction will cause the corresponding totalizer wheel 153 to be rotated in the opposite direction, and vice versa.

The two additional totalizer wheels 151 and 154 of the No. 1 totalizer line are provided in each set of totalizer wheels. The wheels 151 and 154 are mounted free in bearings on the outer surfaces of the bearing members 147 and 150, and are not connected to the drive pinions 155 or to the totalizer wheels 152 and 153. A group of totalizer wheels for each denominational order comprises wheels 151 and 154 for the Group and Taxable Item totalizers and wheels 152 and 153 for the Balance totalizer, said wheels 152 and 153 being geared together for reverse rotation, by the pinions 155.

*Selection and control mechanism for #1 totalizer line*

As has been previously described, the totalizer wheels 151 to 154 inclusive (Fig. 7) are mounted for rotation on the totalizer line 134, which in turn is supported for axial shifting movement in a framework including end members 161 (Figs. 4, 11 and 12) maintained in proper side-spaced relation to each other by various rods and bars. Said framework is shiftably mounted between totalizer end plates 162, only the left hand end plate being shown here, which plates are in turn secured to the corresponding main frames.

An alining bar 159, supported between the end members 161 (Figs. 11 and 12) of the totalizer framework, is shaped along its upper edge to coact with the teeth of the totalizer wheels to retain said wheels in alinement when they are being shifted laterally into and out of alinement with the primary amount differential members 126. The bar 159 has slots 160 opposite each of said primary amount differential members so that the selected set of totalizer wheels are free to be rotated by said primary members. The slots 160 are slightly over three times the width of one of the totalizer wheels, since if either the Plus or Minus side of the Balance totalizer is selected, its complementary side must be free to rotate in the opposite direction. Also it will be noted in Fig. 7 that the totalizer wheels 151 and 154 are of greater than normal thickness so that these wheels will be in partial registry with the bar 159 to retain them against movement when either side of the Balance totalizer is alined with the primary members 126.

Each of the transaction or control keys 113 and 105 to 113 inclusive is provided with a stud 163 which cooperates with corresponding camming surfaces and notches in the periphery of the various control detents associated with the machine control rows. One of said control detents is the manual shifting detent 164 (Fig. 14) for the #1 totalizer line. This detent is free on the shaft 165 and is spring-urged counter-clockwise to normally maintain a finger 167 thereon in yielding contact with the stud 163 for the Amount Tendered key 103. A rearward extension of the detent 164 has a slot which engages a stud 168 in an upward extension of an arm 169 free on a stationary stud 170. The arm 169 is flexibly connected to a companion gear sector 171 by a strong spring 172, and a stud 166 is provided on the sector 171 to coact with the upper edge of the arm 169 to limit clockwise movement of the sector 171 with respect to the arm 169. The teeth of the sector 171 mesh with a gear 173 free on a stationary stud 174 and integral with a spiral grooved drum cam 140 which coacts, through a roller 141 and a block 142 on a shaft 223, with a shifting yoke 143, to shift the #1 totalizer line 134 to aline the selected set of totalizer wheels 151–154 on said line corresponding to the depressed one of the control keys 103 and 105 to 113 inclusive with the corresponding primary differential members 126 (Fig. 4) for actuation thereby.

Figure 6:
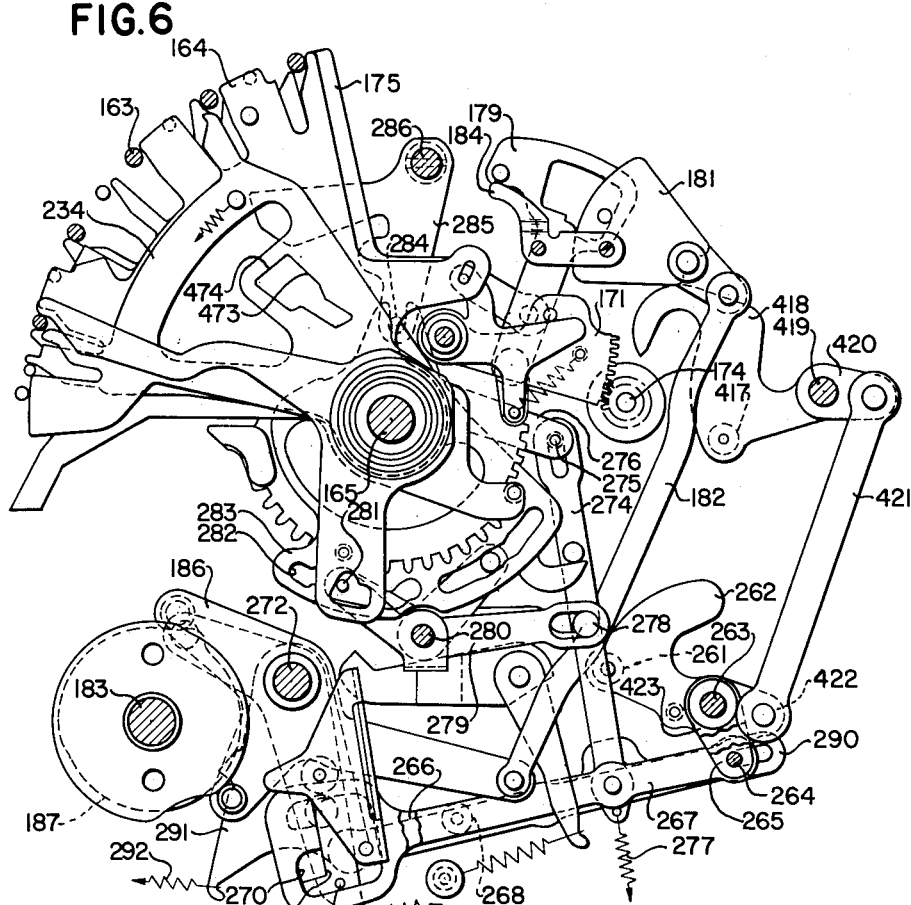
Fig. 6 is a right side elevation of a portion of the mechanism for controlling the engaging, disengaging, and shifting movement of the two totalizer lines.
Figure 16:
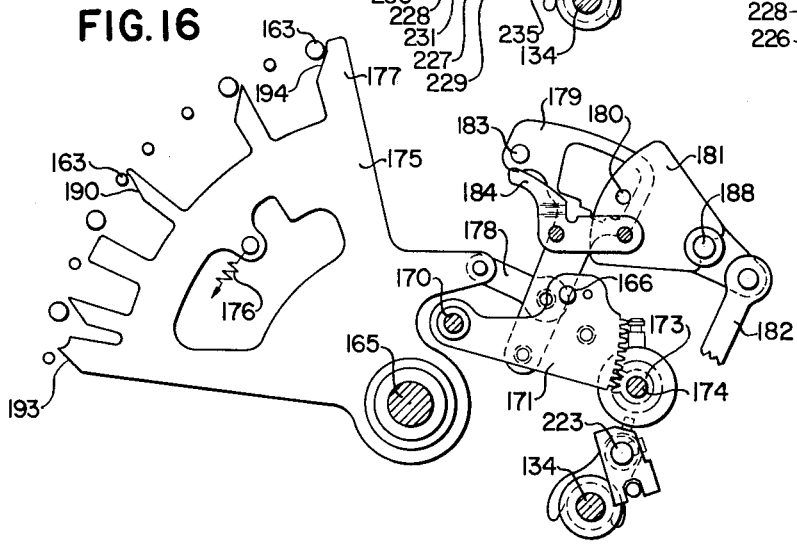
Fig. 16 is a detail view of the mechanism for controlling mechanical shifting of the No. 1 totalizer line.

At the same time that the stud 163 of the selected one of the control keys 103 and 105 to 113 inclusive engages a surface of the detent 164 in cooperative relationship, said stud also makes effective contact with a corresponding surface on a detent 175 (Fig. 16) free on the shaft 165, said detent being urged counter-clockwise by a spring 176 to normally maintain a finger 177 adjacent the camming surface for the Amount Tendered key 103 in yielding contact with the stud 163 for said key 103. The detent 175 is pivotally connected by a link 178 to a totalizer shifting arm 179 pivotally connected near its lower end to the sector 171. The shifting arm 179 has formed therein an opening provided at its lower edge with a number of steps of varying depth. Shifting of the detent 177 in a clockwise direction by coaction of the stud 163 of a selected control key with its corresponding cam surface on said detent, causes the arm 179 to be shifted to place a different step in coacting relationship with a stud 180 in a shifting segment 181 (Figs. 6 and 16). The shifting segment 181 is pivoted on a fixed stud 188 and is operated by a link 182 connecting said segment to a cam follower lever 186 (Fig. 6) which cooperates with a cam 187 on the main machine cam line 183 to cause the stud 180 at a selected time in the operating cycle of the machine to make an excursion downward, as viewed in Fig. 16, and return. It will be seen that the depression of different ones of the control keys will shift the detent 175 and the arm 179 to different positions, thereby causing different ones of the steps in the opening in the arm 179 to be positioned in the path of movement of the stud 180. Since the steps are of varying depth, the extent of movement which is imparted to the sector 171 by the stud 180 through the arm 179 will be varied according to which step is in the path of movement of the stud 180.

A forward extension of the arm 179 (Fig. 16) has thereon a stud 183 which coacts with a stop member 184 fixed to the machine framework to provide a fixed stop for the arm 179 when it is shifted downwardly under influence of the stud 180 in cooperation with one of the steps in the arm 179, as explained above.

The #1 totalizer line shifting means is provided with a spring 185 (Fig. 14) which is effective to restore the #1 totalizer line to home position in which the Taxable Itemizing totalizer is positioned in alinement with the primary differential members 126 at the end of each cycle.

The manner in which each of the transaction keys 103 and 105 to 113 inclusive control shifting of the #1 totalizer line will now be described.

It will be noted that in the home position of the mechanical shifting detent 175, as shown in Fig. 16, one of the steps of the opening in the arm 179 is positioned in the path of the stud 180. If the detent 175 is not shifted from its home position by one of the control keys in a machine operation, the stud 180 will coact with said step to shift the arm 179, and thereby shift the #1 totalizer line 134 so as to position the Plus side 153 of the Balance totalizer on a #1 totalizer line in alignment with the primary differential members 126 when the stud 180 makes its regularly excursioned movement from 98 degrees to 118 degrees of the machine operating cycle.

For this reason the row 2 itemizing keys 109, 110 and 112 do not cause shifting of either of the detents 164 (Fig. 14) or 175 (Fig. 16) when depressed. The arm 179 is retained in its home position and causes shifting of the No. 1 totalizer line 134 to aline the Plus side of the Balance totalizer with differential members 126 when the stud 180 makes its regularly excursioned movement.

Since taxable item amounts are added into their own accumulating Taxable Itemizing totalizer, for the computation of tax on the total of these items in a multiple-item transaction, the mechanical shifting detent 175 is provided with a finger having a cam surface 190 thereon positioned in the path of movement of the key stud 163 for the Tax Items key 111 of row 2, of Fig. 1. Therefore when the key 111 is depressed to initiate a machine operation, the coaction of the stud 163 for the key 111 and the cam surface 190 will cause the detent 175 and the arm 179 to be shifted so as to position the lowermost step in the opening of the arm 179 in the path of movement of the stud 180. The stud 180 will then be ineffective to move the arm 179 to shift the totalizer line 134, which will remain in its home position in which the Taxable Itemizing totalizer 154 (Fig. 7) is alined with the primary differential members 126.

The Refund key 113 in row 2 and the Amount Tendered key 103 in row 1, when depressed, both cause shifting of the manual shifting detent 164 to select the Minus side 152 of the Balance totalizer on the #1 totalizer line 134 for positioning in alinement with the primary differential members 126. The manual shifting detent 164 is provided with fingers having cam surfaces 191 and 192 thereon positioned in the path of movement of the key studs 163 for the keys 113 and 103 respectively. Therefore when either of the keys 113 or 103 is depressed to initiate a machine operation, the coaction of the corresponding stud and cam surface will cause the detent 164 and the arm 169 to be shifted a predetermined amount. This shifting movement will be transmitted to the sector 171 through the flexible spring connection 172 to cause the #1 totalizer line 134 to be shifted to position the Minus side of the Balance totalizer in alinement with the primary differential members 126.

The studs 163 for the keys 103 and 113 also contact corresponding cam surfaces 193 and 194 on fingers provided on the detent 175 (Fig. 16) and these keys are depressed and shift the detent 175 a predetermined amount. Provision is made for shifting of the detent 175 by these keys so that the arm 179 will be moved to a position where the stud 183 on said arm will not contact the fixed stop 184 to block downward movement of the arm 179, which would also block the desired movement of the sector 171.

Depression of the Grocery key 106 (Fig. 1) causes its stud 163 to coact with a cam surface 195 on a finger on the manual shifting detent 164 (Fig. 14) to shift said detent and the arm 169 a predetermined amount. This shifting movement will be transmitted to the sector 171 through the flexible spring connection 172 to cause the #1 totalizer line 134 to be shifted to position the Plus side 153 of the Balance totalizer in alinement with the primary differential members 126. It may be noted that since no cam surface on the detent 175 (Fig. 16) is positioned opposite the stud 163 of the key 106, no movement will be imparted to the detent 175. The arm 179 will therefore not be shifted laterally by the detent 175, but will be shifted downwardly by movement of the sector 171 under influence of the spring 172. The regularly excursioned downward movement of the stud 180 which commences at 98 degrees of the machine cycle will therefore be merely an idle movement.

The Tax Total key 107 is used at the end of the itemizing portion of the multiple-item transaction when it is desired to determine the total amount of the taxable items of the transaction, so that the correct tax may be computed using that total and then may be added into the Plus side of the Balance totalizer to determine the total amount due from the customer. Therefore in a tax total operation, the Taxable Itemizing totalizer of the #1 totalizer line 134 is reset to zero in preparation for the next transaction, and the taxable total amount is added into the Plus side of the Balance totalizer of the #1 totalizer line, so that said Plus side will accumulate the total amount of all items purchased by the customer. In order to accomplish this, it is necessary that the Taxable Itemizing totalizer 154 (Fig. 7) of the #1 totalizer line is in alinement with the primary differential members 126 at the beginning of a machine cycle and while the totalizer engages the primary differential members for a reset operation, and it is then necessary that the #1 totalizer line 134 be shifted to position the Plus side of the Balance totalizer in alinement with the primary differential members for addition into said Plus side of the amount which had been accumulated in the Taxable Itemizing totalizer.

In the machine of the present invention, depression of the Tax Total key 107 does not cause shifting of either of the detents 164 or 175. The #1 totalizer line 134 therefore remains in its home position wherein the Taxable Itemizing totalizer is in alinement with the primary differential members 126 for the first 98 degrees of the cycle of machine operation, during which time said totalizer engages the differential members and positions them according to the amount accumulated on the totalizer. At 98 degrees, after said totalizer has been disengaged from the differential members, the stud 180 begins its regularly excursioned downward movement. Since the arm 179 has not been shifted out of its home position, the coaction of stud 180 with the rightmost step in the opening in arm 179, as viewed in Fig. 16, will cause shifting of the #1 totalizer line 134 to position the Plus side of the Balance totalizer in alinement with the differential members 126 for addition of the accumulated taxable itemizing amount into said Plus side.

The Total key 105 and the Change-Balance Due-No Sale key 108 are identical in the manner in which they control the shifting of the #1 totalizer line 134, the difference in the functioning of the two keys being that the key 105 causes reading of the Plus or Minus side of the Balance totalizer of the #1 totalizer line 134 without its being reset to zero, while the key 108 causes resetting to zero of the Plus or Minus side.

When the key 105 or the key 108 is depressed, either the Plus or the Minus side of the Balance totalizer is selected to be alined with the differential members 126, depending upon whether the balance to be indicated is positive, as where an amount is due from the customer, or negative, as where an amount is owed to the customer. The mechanism by means of which the correct side of the Balance totalizer is selected will now be described.

As has been previously stated, the amounts of all of the items purchased are entered in the Plus side of the Balance totalizer of the #1 totalizer line 134 by use of the Meat, Produce, Grocery, and Tax Item keys (Fig. 1). Similarly, any tax on these purchases is entered in the Plus side by the use of the Tax key. On the other hand, amounts entered by use of the Amount Tendered key 103, representing money given by the customer to the machine operator in payment for his purchase, and amounts entered by use of the Refund Key 113, representing amounts due to the customer for special coupons, bottle deposits, etc. are entered in the Minus side of the Balance totalizer of the #1 totalizer line 134.

Since both "Plus" and "Minus" items may be entered into the cash register, the final accumulated total may be either "Plus" (in which case it should be read off the Plus side, and indicated as "Total" or "Balance Due"), or "Minus" (in which case it should be read off the Minus side and indicated as "Change").

It will be recalled that the Plus and Minus sides of the Balance totalizer (Figs. 7 and 9) are interconnected to rotate in opposite directions with respect to each other, so that an addition to one of said sides will have the effect of a subtraction of the same amount from the other. The Minus side ordinarily registers the complement less "one" of whatever amount is carried on the Plus side, so that when the Plus side registers 00000, the Minus side will stand at 99999. Therefore, when an item is entered in the Plus side, and an item of larger amount is subsequently entered in the Minus side, or vice versa, there will be what is called an overdraft, which will cause the wheels of the highest denomination of both the Plus and Minus sides to pass through their zero positions in opposite directions of rotation, the wheels for the side then alined with the differential members 126 passing through zero in an additive direction, or clockwise.

Each totalizer pinion is provided with a long tooth, such as 200 (Fig. 11). The long tooth of the highest order wheel or pinion of the totalizer of the #1 totalizer line 134 which is alined with the primary differential members 126 is arranged to coact with a pawl 201 when there is an overdraft and said wheel passes through its zero position. The pawl 201 is free on a shaft 202 secured at its ends in the two end members of the framework 161, and said pawl has thereon an extension 203 provided at its end with a stud 204 which is engaged in a slot 205 in an arm 206 mounted on a shaft 207 journaled in the framework 161. Also secured to the shaft 207 at a point approximately opposite the transaction rows of the keyboard is an arm 208 (Fig. 13) having pivotally connected thereto a link 209. The link 209 is provided on one side with a stud 210 adapted to ride in a slot 211 of an arm 212 secured to a shaft 213 free in the machine framework, to which shaft a transfer restoring arm 214 is also secured. The arm 214 (Fig. 4) carries a roller 345 which engages a cam slot 346 in a plate cam 347 secured on a shaft 348 journaled in the frames 162. Also secured on the shaft 348 is a crank 349 pivotally connected by a link 350 to a downward extension of a lever 351 free on a shaft 272 and carrying rollers 352 and 353 which coact, respectively, with the peripheries of companion plate cams 354 and 355, secured on the main cam shaft 183.

On its other side, the link 209 (Fig. 13) is provided with a stud 215 positioned and arranged to coact, under certain conditions, with a sector-shaped stud 216 secured to a lever 217 which is pivotally connected at one end by a stud 218 to the machine framework, and is urged in a clockwise direction, as viewed in Fig. 13, about the stud 218 by a spring 219 tensioned between the lever 217 and the machine framework. At its free end, the lever 217 has a stud 220 which rides in a slot 221 in a pawl 222 secured to the shifting shaft 223 for the #1 totalizer line 134. The stud 220 is of sufficient length to permit the lateral shifting of the pawl 222 without disengagement of said stud 220 from the slot 221. Another stud 224 fixed to the machine framework cooperates with a notch 225 in the pawl 222 to limit the movement thereof.

A finger 226 on the pawl 222 is arranged to coact with a first latch 227 (Figs. 13 and 14) when the Minus side of the Balance totalizer of the #1 totalizer line 134 is alined with the differential members 126. Said finger 226 coacts with a second latch 228 (Figs. 13 and 14) when the Plus side of the Balance totalizer 134 is alined with the differential members 126. The latches 227 and 228 are pivotally mounted on studs 229 and 230 respectively, which are secured to the machine framework. A stud 231 in the latch 227 rides in a slot 232 in the latch 228, which is urged in a counter-clockwise direction as viewed in Figs. 13 and 14 by a spring 233.

Figure 17:
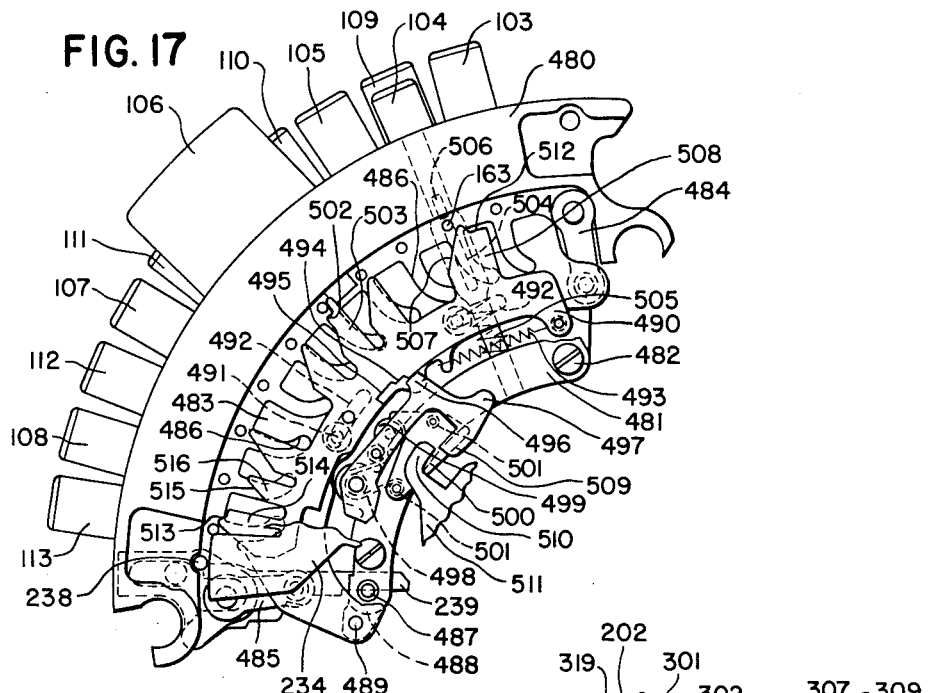
Fig. 17 is a right side elevation showing the control or transaction keys and the means for locking certain of said keys against depression at selected times.

A zero stop bar control detent 234 (Figs. 13 and 14) is pivotally mounted on the shaft 165 and has secured to an extension thereof a stud 235 which is positioned in the path of movement of the lower edge of the latch 227. A spring 236 urges the detent 234 in a counter-clockwise direction, as viewed in Fig. 14, to a position in which a surface 237 on said detent is placed in blocking relation to a stud 238 on a row 2 zero stop bar 239 (Fig. 17). The detent 234 is also formed with two fingers 247 and 248 having cam surfaces 240 and 241 respectively thereon which are arranged to coact with the key stem studs 163 of the keys 105 and 108 respectively, at certain times, as will subsequently be described.

When an overdraft takes place during a machine operation and the long tooth 200 (Fig. 11) shifts the pawl 201 in a counter-clockwise direction, the extension 203 of the pawl 201 causes the arm 206, the shaft 207, and the arm 208 to be rocked in a clockwise direction as viewed in Figs. 11 and 13. The pawl 201, arm 206, shaft 207, and arm 208 are temporarily held in this position by means which will be subsequently described. Since at this time in the cycle of machine operation, the #1 totalizer line 134 is engaged with the amount differential members 126, the shaft 207, which is mounted in the totalizer framework 161, is at the left end, as viewed in Fig. 13, of the slot 242 in the machine framework. Clockwise rocking of the arm 208 therefore causes the stud 215 of the link 209 to be positioned above and to the left of the sector-shaped stud 216.

Subsequently in the cycle of machine operation, the operation of the cams 354 and 355 (Fig. 4) causes the transfer restoring arm 214 to make a regularly excursioned movement, first counter-clockwise and then clockwise, past the position in which it is shown in Fig. 13, as is fully described in the previously mentioned application Serial No. 341,633, now Patent No. 2,880,930. Since both the arms 214 and 212 are secured to the shaft 213, the arm 212 also rocks first counter-clockwise and then clockwise past the position in which it is shown in Fig. 13. The link 209, being operatively connected to the arm 212 by the stud 210 in the slot 211, is thus rocked first clockwise and then counter-clockwise, as viewed in Fig. 13, about its pivotal connection with the arm 208. During the counter-clockwise movement of the link 209, the stud 215 on said link coacts with the sector-shaped stud 216 on the lever 217 to impart a downward or counter-clockwise movement to said lever and to the pawl 222.

Figure 14:
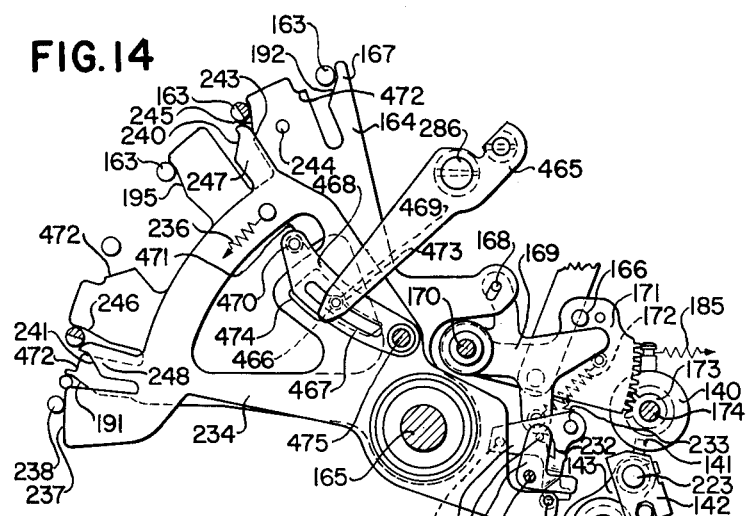
Fig. 14 is a detail view of the mechanism for manually shifting the No. 1 totalizer line.

In the event that the latches 227 and 228 are in the position shown in Figs. 13 and 14 and the Minus side of the Balance totalizer is alined with the primary differential members 126, downward or counter-clockwise movement of the pawl 222 will cause the finger 226 thereon to coact with the upper surface of the horizontal portion of the latch 227 and shift said latch downwardly or clockwise about its pivot 229.

It will be seen from Fig. 13 that clockwise shifting of the latch 227 will position the stud 231 in the vertical portion of the slot 232 in the latch 228, which will then be shifted upwardly or counter-clockwise by the spring 233. This will lock the latch 227 in the position which it has assumed, since the stud 231 will be bottomed in the slot 232 and counterclockwise movement of said latch 227 will therefore be prevented.

The movement of the latch 227 and the coaction of the lower surface of said latch with the stud 235 in the detent 234 will also cause shifting of the detent 234 in a clockwise direction about the shaft 165 to position the cam surfaces 240 and 241 in the path of movement of the key stem studs 163 for the keys 105 and 108 respectively, and to position a vertical surface 243 on the finger 247 adjacent a stud 244 in the manual shifting detent 164. If one of the keys 105 or 108 is then depressed in the next machine operation, or in any following machine operation which takes place without the latch 227 having been previously "unlocked" or released, the coaction of the stud 163 on the stem of the depressed key with its corresponding cam surface 240 or 241 will shift the detent 234 in a clockwise direction as viewed in Fig. 14. The surface 243 will coact with the stud 244 in the detent 164 to shift said detent, and through it the #1 totalizer line 134 in the manner previously described, a sufficient extent to aline the Minus side of the Balance totalizer with the amount differential members 126.

The clockwise shifting of the detent 234 caused by one of the keys 105 and 108 will also move the surface 237 out of the path of movement of stud 238 of the zero stop bar 239 to permit the bar 239 to be shifted inwardly under the influence of the spring. Operation of the machine with the bar 239 in its inward position will cause the transaction differential mechanism to break in zero position and thereby cause a "Change" symbol to be indicated and printed in connection with the machine operation.

The means for releasing or "unlocking" the latch 227 to permit said latch and the detent 234 to return to their normal position as shown in Figs. 13 and 14 will now be described. The "unlocking" is accomplished during a subsequent machine operation in which the Plus side of the Balance totalizer is alined with the amount differential members 126 and an overdraft takes place. For example, this commonly occurs during the first itemizing entry of a multiple-item transaction which follows a previous transaction in which the Minus side of the Balance totalizer was selected by the key 108. At the conclusion of said transaction, the Minus side of the Balance totalizer of the #1 totalizer line 134 will stand at zero and the Plus side will stand at nine. Therefore when the first itemizing entry is entered by the use of any of the keys 106, 109, 110 or 111, the Plus side of the Balance totalizer will be alined with the amount differential members 126 and the highest order wheel of the Plus side will pass through zero as the amount of the item is added into said plus totalizer.

The overdraft will cause a downward movement of the pawl 222 (Figs. 13 and 14) in the manner previously described. Since the Plus side is alined with the primary differential members 126, the latch 228 will be positioned in the path of movement of the finger 226 of the pawl 222, and downward shifting of the pawl 222 will cause a downward or clockwise shifting as viewed in Figs. 13 and 14, of the latch 228 about its pivot 230 against the force of the spring 233. This positions the slot 232 in the latch 228 so as to permit movement of the stud 231 and the latch 227 to the left or counter-clockwise to return to the normal position in which they are shown in Figs. 13 and 14. Both the latch 227 and the detent 234 are restored to normal position by the spring 236 on said detent.

It will be seen from Fig. 14 that whenever one of the keys 105 or 108 is depressed and the detent 234 has not been shifted clockwise to a position in which its surface 243 is adjacent the stud 244 on the detent 164, the key stem stud 163 of the selected key 105 or 108 will not contact any surfaces on the detent 234, due to a slot extending partially through said key stem studs. The detent 164 has two cam surfaces 245 and 246 positioned in the patch of movement of the stud 163 for the keys 105 and 108 respectively, and the coaction of the stud 163 of the selected key with its corresponding cam surface 245 or 246 will cause shifting of the #1 totalizer line 134 to aline the Plus side of the Balance totalizer with the primary differential members 126.

In summary, depression of one of the keys 105 or 108 will cause selection of the Minus side of the Balance totalizer when the latch 227 is in a locked-down condition, and will cause selection of the Plus side of the Balance totalizer when the latch 227 is in its normal position, as shown in Figs. 13 and 14.

The key 108 (Fig. 1) may also be used as a No Sale key if desired. If the operation immediately preceding has caused the Balance totalizer to be cleared or to remain cleared, depression of the key 108 will in effect give a No Sale operation and will cause the cash drawer of the machine to be opened. The indication and printing for such an operation will be zeros followed by the symbol for "Change" or "Balance Due," depending upon whether or not the latch 227 is locked down at the time of the operation.

*Engaging and disengaging mechanism for the #1 totalizer line*

Mechanism operating under control of the control keys 103 and 105 to 113 inclusive (Fig. 1) and under control of the total control lever 116, is provided for controlling engaging movement of the shiftable framework for the #1 totalizer line 134, to engage the selected set of totalizer wheels on said line with the primary differential members 126 in proper timing for the type of operation being performed.

On the #1 totalizer line framework (Figs. 4 and 6) is a shaft 255 having rollers 256 on opposite ends thereof, engaged respectively by arms 257 and 258 secured on a shaft 259 journaled in the machine framework. The arm 257 has a cam slot 260 engaged by a roller 261 carried by an arm 262 (Fig. 6) free on a stud 263 extending between the right side frame 100 and the right totalizer end plate 162. A stud 264, supported by a downward extension of the arm 262 and a crank 265 secured to said arm, pivotally supports the rearward ends of an "add" engaging pitman 266 and a "subtract" engaging pitman 267, said pitmans being secured and properly spaced in fixed relationship to each other by a stud 268. The pitmans 266 and 267 have, respectively, enlarged forward ends with openings 269 and 270, forming totalizer engaging surfaces, which coact respectively with engaging studs (not shown) in similar cam levers 271, only one of which is shown in Fig. 6, rotatably supported by a shaft 272 journaled in the machine framework. Springs 273 urge the levers 271 counter-clockwise to normally maintain rollers (not shown) carried thereby in yielding contact with the edges of corresponding plate "add" and "reset" cams (not shown) secured on the main cam shaft 183 journaled in the machine framework and receiving one clockwise revolution of movement each machine operation.

The control surfaces in the openings in the forward ends of the pitmans 266 and 267 (Fig. 6) are positioned in relation to the corresponding operating studs in the cam levers 271 through the medium of a link 274, which is pivotally connected at its lower end to the pitmans 266 and 267 while the upper end of said link is slotted to receive a stud 275 in a segment 276 free on the shaft 165. The segment 276 has camming lugs (not shown) which cooperate with the studs 163 in the control keys 103 and 105 to 113 inclusive. A spring 277 urges the pitmans and the link 274 downwardly and the segment 276 clockwise to normally maintain extending fingers of said camming lugs in yielding contact with the corresponding studs 163.

The link 274 (Fig. 6) carries a stud 278 which engages the slot in the rearward end of a lever 279 free on a stud 280 fast on the right side frame 100. The forward end of the lever 279 carries a stud 281, which extends through a camming slot 282 in a segment 283 free on the shaft 165, and having an upward extension with a slot which engages a stud 284 in an arm 285 secured on a shaft 286 journaled in the machine framework. The shaft 286 is secured to a second arm 287 (Fig. 10) having a stud 288 positioned in the lower end thereof and cooperating with a slot 289 in the total control lever 116, so that operation of said total control lever will position the segment 283, thus causing the camming slot 282, in cooperation with the stud 281, to position the pitmans 266 and 267 in accordance with the position of said total control lever.

The mechanism just described imparts engaging movement only to the #1 totalizer framework, and separate means is provided for imparting disengaging movement to said framework. The stud 264 in the crank 265 engages a slot in the rearward end of a link 290 (Fig. 6), the forward end of which is pivoted on a stud (not shown) in a cam arm 291 free on the shaft 272 and urged clockwise by a spring 292 to normally maintain a roller (not shown) carried thereby in yielding contact with a camming edge of a disengaging cam (not shown) secured on the main cam shaft 183 and receiving one clockwise revolution of movement each machine operation.

The manner in which the mechanism described above imparts engaging and disengaging movement to the #1 totalizer framework, and controls such movement, is fully described in the previously mentioned application Serial No. 412,464, to which reference may be had for a complete description thereof.

The #1 totalizer line is provided with a tens transfer mechanism for transferring tens digits from lower to higher denomination, said transfer mechanism being common to the four sets of totalizer wheels on the #1 totalizer line, and coacting therewith when said wheels are alined with the primary differential members 126 for actution thereby. The tens transfer mechanism functions in reading and resetting operations to coact with the long teeth of the selected totalizer wheels to stop said wheels in zero position and said wheels, in turn, position the corresponding primary differential members accordingly. The construction and mode of operation of the tens transfer mechanism is fully disclosed in the copending application, Serial No. 341,633, now Patent No. 2,880,930, to which reference may be had for a more detailed description of this mechanism, if necessary or desired.

A retaining pawl 300 (Figs. 12 and 18) is provided for each denominational order of the #1 totalizer line 134. Each pawl 300 is positioned opposite the corresponding slot 160 in the alining bar 159, and is of a slighter greater width than said slot, for the purpose of retaining such totalizer wheels as are alined with the slot against displacement prior to the engagement of the selected set of totalizer wheels with the primary differential members 126. The pawls 300 are rotatably supported by the rod 202, and each pawl is provided with a spring 301, which urges said pawl clockwise to maintain a rearwardly extending finger 302 thereof in yielding engagement with a rod 303 extending through clearance slots in the totalizer framework end members 161 and supported by right and left arms 304 and 305 (Fig. 18), in turn rotatably mounted on the hubs in the end members 161 which support the rod 207.

Figure 18:
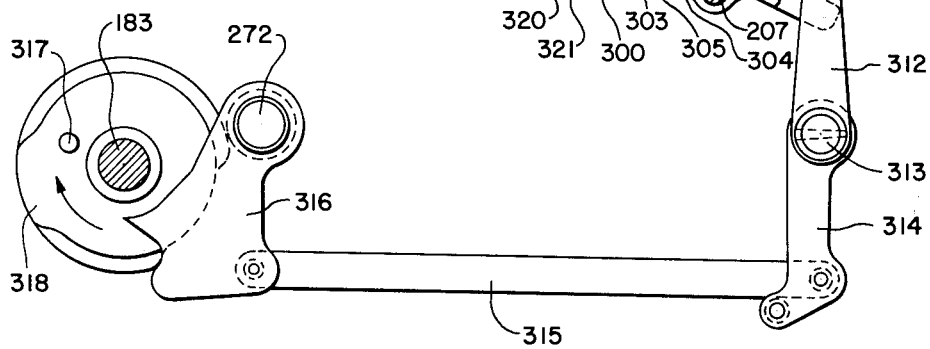
Fig. 18 is a detail view showing the cam-operated means for withdrawing the retaining pawls from engagement with the totalizers of the No. 1 totalizer line in order to permit reverse rotation of one side of the balance totalizer during a transfer operation.

When the totalizer framework of the #1 totalizer line 134 is in disengaged position, as shown in Figs. 12 and 18, the springs 301 yieldingly maintain the pawls 300 in yielding engagement with the teeth of the totalizer wheels which are alined with the slot 160 in the alining bar 159. During engaging movement in a forward direction, or toward the left, as viewed here, of the totalizer framework, the pawls 300 remain in engagement with the teeth of the totalizer wheels until after the teeth of the selected totalizer wheels are meshed with the corresponding primary differential members 126, after which stop surfaces 307 of the arms 304 and 305 engage a stationary stud 308 mounted in the machine framework, and continued engaging movement of said framework causes said arms and the rod 303 to be rocked clockwise. Clockwise movement of the rod 303, in cooperation with the fingers 302, rocks the pawls 300 counterclockwise to disengage said pawls from the teeth of corresponding wheels of the selected totalizer to free said wheels for actuation by the primary differential members.

The arms 304 and 305 are provided with extensions 309 and 310 respectively which coact with two rollers 311, each of which is mounted on an arm 312 secured to a shaft 313 mounted in the machine framework. The extensions 309 and 310 are of sufficient length that they will remain in coacting relationship with the rollers 311 throughout the engaging and disengaging movement of the #1 totalizer line 134 and its associated framework. Also secured to the shaft 313 is an arm 314 operatively connected by means of a link 315 to a cam follower 316 pivoted on the shaft 272 and having a surface thereon adapted to coact with a stud 317 on a cam 318 secured on the main cam line 183.

Disengaging movement to the rear, or toward the right, of the framework of the #1 totalizer line 134 (Figs. 12 and 18) withdraws the stop surfaces 307 from the stud 308 and permits the springs 301 to again engage the pawls 300 with the teeth of the corresponding totalizer wheels, as said wheels are being disengaged from the primary differential members 126, to prevent displacement of said wheels after they are fully disengaged from said primary differential members. However at the time the framework for the #1 totalizer line 134 commences its disengaging movement, the stud 317 on the cam 318 contacts the cam surface of the cam follower 316 and imparts a counterclockwise shifting movement, as viewed in Fig. 18, through the link 315 to the arms 312 and 314.

This shifting movement causes the rollers 311 to coact with the extensions 309 and 310 of the arms 304 and 305, to shift said arms and the rod 303 in a clockwise direction as viewed in Fig. 18. The rod 303 engages the fingers 302 of the retaining pawls 300 and shifts said pawls in a counter-clockwise direction as viewed in Fig. 18 sufficiently to retain said pawls in partially disengaged relationship to the corresponding totalizer wheels of the #1 totalizer line 134. As may be seen in Fig. 18, the totalizer wheel engaging portion of the pawls 300 is formed on one side with a cam surface 319 and on the other side with a shorter cam surface 320 and a blocking surface 321. These two cam surfaces 319 and 320 act to position precisely the totalizer wheels, since the totalizer wheel engaging portion of the pawl 300 is substantially the width of the space between the teeth of the totalizer wheels. When the retaining pawls are fully engaged with the totalizer wheels, the cam surface 319 permits the wheels to rotate in a clockwise direction as viewed in Fig. 18, for the purpose of making a transfer from one order to the next higher order, since the teeth of the totalizer wheels can coact with the cam surface 319 to cam the pawl 300 out of its retaining position. However with the retaining pawls fully engaged, movement of the totalizer wheels in a counter-clockwise direction as viewed in Fig. 18 is not possible, since the teeth of the totalizer wheels will contact the blocking surface 321 rather than the cam surface 320 of the pawl 300.

Since transferring of a unit into any of the totalizer wheels of either the Plus or Minus side of the Balance totalizer causes reverse rotation of the complementary totalizer wheel at the time the selected totalizer wheel rotates clockwise as viewed in Fig. 18, it will be seen that it is desirable that the pawl 300 be shifted out of engaged position by the reverse rotation of the complementary totalizer wheel as well as by the clockwise rotation of the selected wheel, in order to insure that the transfer operation will take place properly, and without binding. This is accomplished by the shifting of the pawl 300 to a partially disengaged position through the coaction of the stud 317 on the cam 318 with the follower 316, which movement takes place at the same time that the disengaging movement of the #1 totalizer line 134 commences. The pawl 300 is shifted sufficiently in a counter-clockwise direction as viewed in Fig. 18 to position its cam surface 320, rather than the blocking surface 321, in the path of movement of the teeth of the totalizer wheels. This permits the reversely rotating totalizer wheels as well as the selected totalizer wheels to cam the pawl 300 out of retaining position during a transfer operation.

*"Fugitive 1" mechanism*

In the type of Balance totalizer with which the present machine is equipped, it is necessary to enter a "fugitive 1" in the lowest order wheel of whichever one of the Plus or Minus sides of the Balance totalizer is alined with the primary differential members 126 when the highest order wheel passes through zero, in order to correct the amount standing on the selected totalizer wheels. This entering of the "fugitive 1" is effected automatically by mechanism comprising the pawl 201 (Fig. 11), the arm 206 to which it is operatively connected, and the shaft 207 to which said arm is secured. Also secured to the shaft 207 opposite the lowest order set of totalizer wheels of the #1 totalizer line 134 is an arm 325 (Fig. 12), which is urged in a counter-clockwise direction by a spring 326 secured to said arm and to the machine framework. A slot in the arm 325 is positioned to coact with a stud 327 on a latch 328 pivotally mounted on a shaft 329 extending between the totalizer frame end members 161. A rod 330, also extending between the members 161, acts as a stop to limit downward or counter-clockwise movement, as viewed in Fig. 12, of the latch 328.

A shoulder on the latch 328 coacts with a similar shoulder 331 on a transverse slide 332, shiftably supported in the framework of the No. 1 totalizer line 134 by means of a rod 333, in turn supported in said framework, and by means of an outwardly extending finger 334 of said slide, the upper surface of which coacts with a transfer restoring rod 335, supported for shifting movement in the totalizer framework by means of alined slots in the end members 161 of said framework. The slide 332 carries a stud 336, which rotatably supports a transfer pawl 337 having a tooth 338 which coacts with the teeth of the selected totalizer wheel of the units row. A spring 339 urges the pawl 337 clockwise to normally maintain a stud 340 carried thereby in yielding contact with the upper surface of a slot 341 in the slide 332. Opposite ends of the restoring rod 335 are engaged by slots in the upper ends of companion arms 342 and 343 (Figs. 4 and 13) secured in proper spaced relationship to each other on the shaft 213, journaled in the frames 162. Also secured to the shaft 213 is the arm 214, which, it will be recalled, is moved in response to the rotation of the companion cams 354 and 355 on the main cam line 183.

Whenever the highest order Plus or Minus wheel (whichever is selected) passes through zero, the long tooth thereon rocks the pawl 201 (Fig. 11) and its extension the restoring rod 335 are engaged by slots in the upper ends of companion arms 342 and 343 (Figs. 4 and 203 counter-clockwise to rock the arm 206, the shaft 207 (Fig. 12) and the arm 325 clockwise against the force of the spring 326. Clockwise movement of the arm 325 causes the slot therein, in cooperation with the stud 327 on the latch 328 for the lowest order, to rock said latch out of engagement with the shoulder 331 of the transfer slide 332. This frees the slide 332 and the transfer pawl 337 to the action of a spring 344, which immediately carries said parts outwardly or toward the left, as viewed in Fig. 12, until said slide contacts the restoring rod 335. This slight movement is not enough to effect the transfer movement of the pawl 337, but is sufficient to move the shoulder 331 on the slide 332 beyond and out of the path of the corresponding shoulder on the latch 328, so that said latch 328 will not interfere with subsequent complete transfer movement of said slide 332 is an outward direction.

This movement, by retaining the latch 328 in an elevated position, also locks the arm 325, the shaft 207, which is secured to said arm, and the arms 206 (Fig. 11) and 208 (Fig. 13) against return counter-clockwise movement under the influence of the spring 326, since the engagement of the stud 327 on the latch with its cooperating slot in the arm 325 blocks counter-clockwise movement of said arm.

After the totalizer wheel has been actuated by the primary differential members 126, the frame for the No. 1 totalizer line 134 is rocked outwardly to disengage the wheel from said primary differential member, and during this disengaging movement the transfer restoring rod 335 receives its first movement, which shifts said rod toward the left, as viewed in Fig. 12, to permit the spring 344 to impart further outward or lefthand movement to the transfer pawl 337 and the slide 332 to cause the tooth 338 of said pawl to engage the teeth of the lowest order wheel of the selected side of the Balance totalizer 134 and advance said wheel one step in an additive direction to enter the unit correction on said wheel.

After the transfer has been effected, the rod 335 receives its second movement, which movement shifts said rod the full distance to the rear or toward the right, as viewed in Fig. 12, and during this movement said rod carries the slide 332 and the transfer pawl 337 in unison therewith, against the tension of the spring 344. During this restoring or righthand movement of the slide 332, the shoulder 331 thereon by-passes the shoulder on the latch 328, whereupon the spring 326 on the arm 325 is effective to shift said arm in a counter-clockwise direction, thus causing the latch 328 to move in a counter-clockwise direction, as viewed in Fig. 12, through the interaction of the stud 327 on the latch 328 and the slot on the arm 325, to return the shoulder on the latch 328 into the path of the shoulder 331, to retain the slide 332 and the transfer pawl 337 in restored or untripped positions, as shown here. Just prior to the end of machine operation the transfer restoring rod 335 is returned forwardly or toward the left, as shown in Figs. 11 and 12, in which position it remains at the end of machine operation and during the initial part of the succeeding machine operation, as explained above.

*Selection and control mechanism for the No. 2 totalizer line*

The No. 2 totalizer line 136 (Figs. 4 and 8) comprises five sets of totalizer wheels 135, controlled by the control keys 106 and 109 to 113 inclusive, and alined by the depression of said keys with the primary differential members 126 for actuation thereby. The five totalizers are interspersed on the No. 2 totalizer line 136 and in each denominational set of pinions are arranged as follows, from left to right, viewing the machine from the front: Meat; Produce; Grocery and Taxable Items; Tax; and Refund.

The five sets of No. 2 totalizer wheels 135 (Fig. 4) are rotatably mounted on a sleeve 360, in turn slidably supported by the No. 2 totalizer line or shaft 136, said shaft in turn supported by the end plates 161 of the No. 2 totalizer framework, which is shiftably mounted between the right and left totalizer main frames 162. Mounted to slide on the shaft 136 (Fig. 8) in unison with the sleeve 360, is a shifting collar 361 having an annular groove engaged by the tines of a shifting fork 362, free on a shifting rod 363, shiftably supported by the frames 162, said shifting fork being confined between collars secured to said rod 363, so that it will shift laterally in unison therewith. Secured on the righthand end of the rod 363 is a shifting block 364 having a slot which slidably engages a fixed stud 365 to hold said block and said rod against rotation.

The block 364 carries a screw stud 366, which engages a helical shifting groove in a shifting cam 367, rotatably supported on a stud 368 secured in the right frame 162. Secured to the left face of the shifting cam 367 in a pinion 369 engaged by teeth in a shifting sector 370, free on the shaft 165, and having a slot engaged by the rounded inner arm of a lever 371, rotatably supported by a stationary stud 372. The forward arm of the lever 371 has a slot which engages a stud 373 in a selecting plate 374, rockably supported by companion arms 375 and 376, in turn rotatably supported by studs 377, secured in the frame for the second transaction bank. The plate 374 has five shifting notches 378 (Fig. 8) arranged to coact, respectively, with corresponding studs 163 in the stems of the control keys 109 to 113 inclusive, and also has a member 379 provided with a shifting notch 380 secured thereto, for coaction with the stud 163 of the control key 106. Only one of the control keys 106 and 109 to 113 inclusive may be depressed at a time.

Depression of any one of the control keys 106 and 109 to 113 inclusive causes its stud 163, in cooperation with the corresponding shifting notch 378 or 380, to rock the plate 374 an extent corresponding to the depressed key. The movement of the plate 374 is transmitted by the lever 371 to the sector 370 to rotate the cam 367 to cause the groove therein, in cooperation with the stud 366, to shift the rod 363, the fork 362, the sleeve 360 (Fig. 4), and the totalizer wheels 135 of the #2 totalizer line 136 to aline the set of totalizer wheels corresponding to the depressed control key inclusive with the primary differential members 126 for actuation thereby. It will be seen that the act of depressing one of the control keys 106 and 109 to 113 inclusive alines the corresponding set of totalizer wheels 135 on the #2 totalizer line with the primary differential members 126.

Means is provided to retain the sector 370 (Fig. 8) and connected mechanism in set position during machine operation, and this mechanism comprises an aliner 385, arranged to engage teeth in a downward portion of said sector 370. The aliner 385 is free on a stud 386 on the right side frame and has secured in fixed relation thereto a downwardly extending arm 387, said arm and said aliner being urged clockwise by a spring 388 to normally maintain the forward edge of said arm 387 in yielding contact with a stud 389 extending between the disengaging link 290 (Figs. 6 and 8) for the #1 totalizer line 134 and a similar link (not shown) for the #2 totalizer line 136, said links being similar in outline and operating in unison to disengage their corresponding totalizers. The aliner 385 functions according to the operation of the disengaging cam (not shown) to engage and disengage the teeth in the sector 370 to retain said sector and connected parts, including the sleeve 360 (Fig. 4), supporting the #2 totalizer wheels 135, in set position during the periods of machine operation in which the selected set of #2 totalizer wheels are engaged with the primary differential members 126 for actuation thereby.

Shiftably secured to the detent 374 (Fig. 8) is a detent 390 which is provided for control of the printing mechanism (not shown) for the detail strip, a portion of which is shown in Fig. 3. The means for shiftably securing the detent 390 to the detent 374 comprises studs 391 in the detent 390 which ride in corresponding slots 392 in the detent 374. Fingers 393 with cam surfaces 394 thereon are provided on the detent 390 opposite the studs 163 for certain of the control keys 109 to 113 inclusive. At its lower end, the detent 390 is provided with an enlarged portion 395 having a stud 396 thereon which cooperates with a slot in an arm 397 secured to a shaft 398 mounted for rotation in the machine framework. Also secured to the shaft 398 is an arm 399 connected by a link 400 to a disabling arm 401 on a shaft 402 rotatably mounted in the machine framework, said arm being urged in a clockwise direction as viewed in Fig. 8 by a spring 403. Counter-clockwise rotation of the arm 401, as viewed in Fig. 8, will position its hook-shaped end portion under a bent-over ear 404 on the outer end of a printer control arm 405 to prevent counter-clockwise rotation of said arm about its pivot 406. Depression of one of the control keys 109 to 113 inclusive opposite which a finger 393 with a cam surface 394 is provided on the detent 390, will cause shifting of said detent 390 in a clockwise direction as viewed in Fig. 8, due to the coaction of the key stem stud 163 of the depressed control key and the corresponding cam surface 394. Such clockwise shifting of the detent 390 causes counter-clockwise shifting of the disabling arm 401 through the linkage comprising the arm 397, the shaft 398, the arm 399, and the link 400, against the influence of the spring 403. Said shifting of the disabling arm 401 positions the hook-shaped portion of said arm under the bent-over ear 404 of the printer control arm 405, thus preventing counter-clockwise rotation of said arm about its pivot 406. The printer control arm 405 is thereby retained in an ineffective position and cannot disable the functioning of the detail printing mechanism during the current cycle of machine operation. The manner in which the printer control arm 405 controls the operation of the detail printing mechanism is fully explained in the previously mentioned applications Serial No. 341,633, now Patent No. 2,880,930, and Serial No. 533,413, now Patent No. 2,800,854, to which reference may be had for a complete description thereof.

Figure 8:
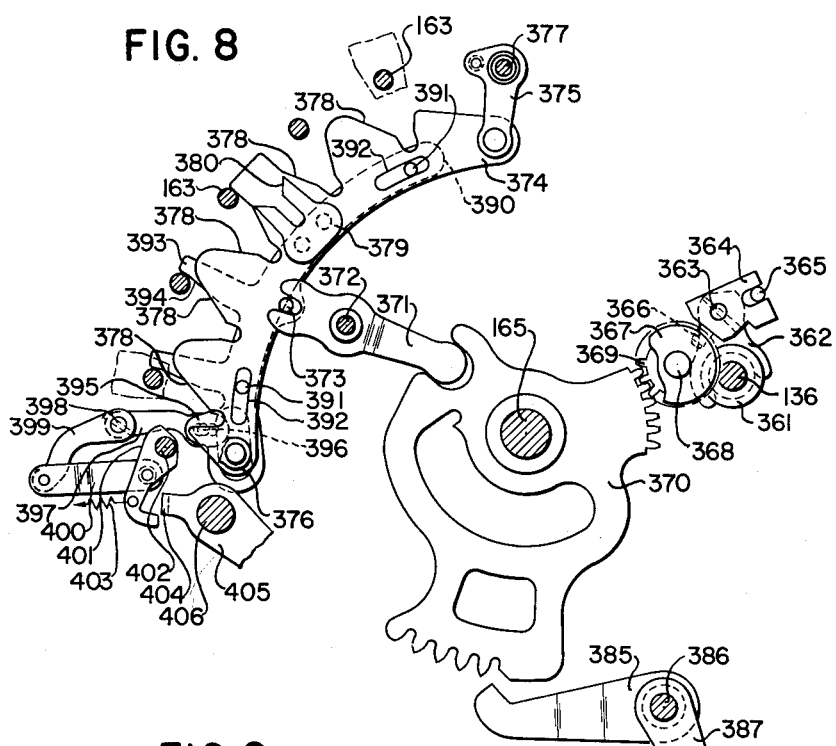
Fig. 8 is a right side elevation of a portion of the mechanisms for controlling the shifting movement of the No. 2 totalizer line, and for controlling the printing operations in connection therewith.

Upon release of the depressed control key 109 to 113 inclusive, the spring 403 will cause the disabling arm 401 and its associated mechanism to be shifted back in the position in which said mechanism is shown in Fig. 8, thus removing the hook-shaped end portion of the arm 401 from the path of movement of the bent-over ear 404 of the printer control arm 405.

It will be seen in Fig. 8 that the fingers 393 with their cam surfaces 394 are provided on the detent 390 only opposite the key studs 163 for the Tax and Refund keys 112 and 113 respectively, and that no fingers are provided for the keys 109, 110 and 111. Therefore with the detent in the form shown, Tax and Refund operations, initiated by depression of the keys 112 and 113 respectively, would be printed on the detail strip 119, while transactions initiated by depression of the keys 109, 110 and 111 would not be printed on said strip, since in such instances the detent 390 will not be shifted in a clockwise direction to position the hook portion of the arm 401 in blocking relation to the bent-over ear 404 of the printer control arm 405 to retain said printer control arm against counter-clockwise movement, said counter-clockwise movement acting to disable the detail printing mechanism. However, the fingers 393 on the detent 390 may be provided opposite any of the control keys 109 to 113 inclusive in order that transactions initiated by depression of any of these keys will be recorded on the detail strip 119. Similarly the fingers 393 may be omitted opposite any of the control keys 109 to 113, to prevent a record of any of the transactions initiated by any of said keys from being printed on the detail strip 119, if desired.

The sliding connection between the detent 390 and the detent 374 is of course provided so that the detent 374 may be shifted without causing corresponding shifting movement of the detent 390 in a case where a finger 393 is not provided on the detent 390 opposite the particular control key 109 to 113 inclusive which is depressed.

*Engaging and disengaging means for the #2 totalizer line*

Mechanism similar to that described for the #1 totalizer framework is provided for imparting engaging movement to the #2 totalizer framework, to engage the selected set of totalizer wheels thereon with the primary differential members 126 in accordance with the type of operation being performed. The totalizer disengaging mechanism shown in Fig. 6 and explained before, also functions to impart disengaging movement to the #2 totalizer and its framework in exactly the same manner as explained for the #1 totalizer framework.

The #2 totalizer framework 410 (Fig. 4) supports a shaft 411, opposite ends of which carry rollers 412 which coact with slots in the frames 162 to assist in shiftably supporting said framework 410. The rollers 412 are engaged, respectively, by slots in the upper ends of arms 413 and 414 secured on a shaft 415 journaled in the totalizer frames 162. The arm 413 has a cam slot 416 engaged by a roller 417 (Figs. 4 and 6) carried by an arm 418 free on a rod 419 extending through the machine framework, said arm 418 being integral with a crank 420 having pivotally connected thereto the upper end of a link 421. The lower end of the link 421 is pivotally connected to a stud carried by a bell crank 422 free on the stud 263, which with the assistance of a companion crank 423 supports a stud (not shown) which in turn pivotally supports the rearward end of two pitmans (not shown) similar to the engaging pitmans 266 and 267 for the #1 totalizer line 134, and provided at forward ends with enlarged portions having openings therein, said openings cooperating with operating studs in levers which are actuated for movement by cams carried on the main cam line 183.

Disengaging movement is imparted to the #2 totalizer framework 410 by the same mechanism which imparts disengaging movement to the #1 totalizer framework, said mechanism being shown in Fig. 6. The disengaging link 290 for the #1 totalizer line 134 is connected in fixed relationship to a similar disengaging link for the #2 totalizer line, the rear end of which is operatively connected to the bell crank 422, and as a result, disengaging movement is imparted to the #2 totalizer framework 410 through the bell crank 422 and the link 421 in exactly the same manner as explained previously in connection with the #1 totalizer line.

For a more detailed description of the construction and operation of the engaging and disengaging mechanism for the #2 totalizer line, reference may be had to the previously mentioned application Serial No. 412,464.

The #2 totalizer line is provided with a tens transfer mechanism for transferring tens digits from lower to higher denominations, said tens transfer mechanism being common to the five sets of totalizers on said #2 totalizer line, and coacting with the wheels of each of said totalizers when they are moved into alinement with the primary differential members 126 for actuation thereby.

Figure 5:
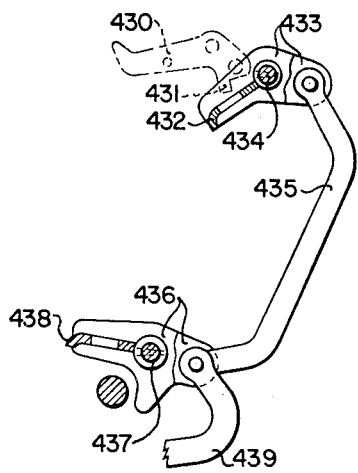
Fig. 5 is a detail view of the mechanism for preventing tripping of the transfer pawls in total-taking operations.

The tens transfer mechanism for the #2 line is identical to that provided for the #1 totalizer line which, as previously explained, is fully disclosed in the co-pending application, Serial No. 341,633, now Patent No. 2,880,930, and comprises a transfer pawl 430 (Fig. 5) for each denominational order for transferring tens digits from lower to higher denominations. In sub-total and total operations, often referred to as Read and Reset operations, the wheels of the selected totalizer are reversely rotated until stopped by long teeth thereon coming in contact with the edge of a corresponding stop bail (not shown) to position said wheels in zero and to in turn adjust the primary differential members accordingly.

During the time that the selected totalizer wheels are being reversely rotated, it is necessary that the transfer pawls 430 be retained out of the path of the teeth of said wheels so as not to interfere with their rotation. Each of the transfer pawls 430 for the #2 totalizer line 136 has a downward projection 431 arranged to be engaged by a corresponding slot in a bar 432 supported at each end by corresponding arms 433 in turn pivotally mounted on trunnion studs 434 secured in the machine framework. The left hand arm 433 is pivotally connected by a link 435 to a corresponding left arm 436 for the #1 totalizer line 134 which, with a corresponding right arm 436, is rotatably supported on corresponding trunnion studs 437 secured in the machine framework. The arms 436 support a bar 438 with slots which engage downward projections on the corresponding #1 transfer pawls (not shown) similar in every respect to the transfer pawls 430 for the upper or #2 totalizer line. The left arm 436 (Fig. 5) is pivotally connected by a link 439 to a stud 440 (Fig. 6) in the #1 reset cam lever 271 for the #1 totalizer line 134. The lever 271 functions in proper timing to engage the slots in the bars 432 and 438 (Fig. 5), with the projections 431 on the transfer pawls 430 to retain said pawls in fully disengaged positions so that the teeth thereof will not stumble on the teeth of the wheels of the selected totalizer on the #1 and #2 totalizer lines.

For a full disclosure of the mechanism for retaining the transfer pawls for the #1 totalizer line in disengaged position during reading and resetting operations, reference may be had to the application Serial No. 341,633, now Patent No. 2,880,930.

*Total control lever mechanism*

As has been stated, the total control lever 116 is movable to various positions to control the various functions of the machine, and is provided with a lock 117 for locking said lever in a selected position. Novel means is provided for utilizing the total control lever 116 in conjunction with the release key 115 to lock the machine against operation.

Figure 19:
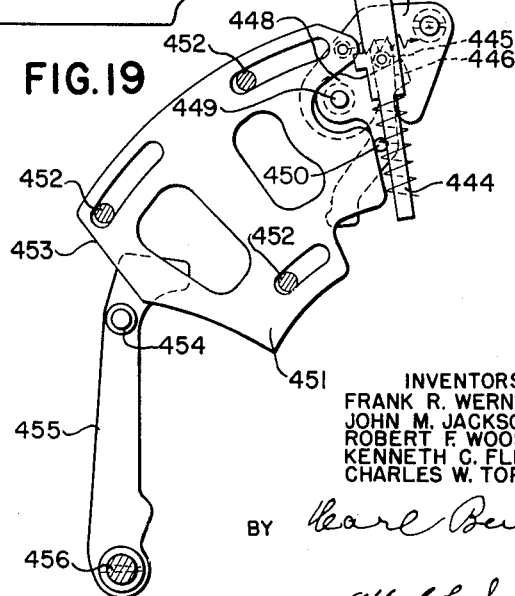
Fig. 19 is a detail view of the mechanism for manually releasing any depressed amount and transaction keys, which mechanism may also be used for locking the machine in inoperative condition.

Depression of the Release key 115 (Figs. 1 and 19), which is urged outwardly by a spring 444, causes a stud 445 (Figs. 10 and 19) carried thereby and engaging a slot 446 in a plate 447 secured to the left side frame 101, to contact the upper surface of a segment 448 free on a stud 449 in the left side frame 101, and to rock said segment clockwise. Clockwise movement of the segment 448 causes a stud 450 therein, in cooperation with a flat inner surface on a slide 451 (Fig. 19), shiftably mounted on the key frame (not shown) for the row of keys which include the release key, by means of three slots therein in cooperation with three studs 452 secured in said frame, to shift said slide downwardly or counter-clockwise as viewed in Fig. 19 against the action of a spring (not shown) tensioned between said slide and said key frame. Downward movement of the slide 451 causes a camming surface 453 thereon, in cooperation with a roller 454 mounted on the upper end of an arm 455 secured to a shaft 456, to rock said arm and said shaft counter-clockwise from the normal position shown in Fig. 19. As is fully disclosed in the previously mentioned application Serial No. 341,633, now Patent No. 2,880,930, such a movement of the shaft 456 from the position in which it is shown in Fig. 19 is effective to cause the release of any depressed amount key 102, and is also effective to prevent the initiation of a cycle of machine operation by depression of any one of the control keys 103 and 105 to 113 inclusive.

The segment 448 is also provided with an arm 457. When the total control lever 116 is in "Register" position, a flattened stud 458 (Fig. 10), secured to a slide 459 shiftably mounted on the control lever 116 by means of two slots in the slide, in cooperation with two studs 460 secured in said lever 116, will be interposed in the path of movement of the arm 457 and will be urged upward by contact of its lower surface with the upper surface of said arm in an idle movement against the force of a spring 461 tensioned between the slide 459 and the lever 116.

The manner in which the total control lever 116 and the release key 115 may be used to lock the machine to prevent the operation thereof will now be described. The total control lever 116 is first shifted counter-clockwise as viewed in Fig. 10 to "Read Row 1" or "Reset Row 1" position to shift the stud 458 out of the path of movement of the arm 457 of the segment 448. The release key 115 is then depressed to rock the segment 448 with its arm 457 clockwise as viewed in Figs. 10 and 19, thereby rocking the shaft 456 (Fig. 19) counter-clockwise. It will be recalled that such a movement of the shaft 456 from the position in which it is shown in Fig. 19 is effective to prevent the initiation of a cycle of machine operation. The total control lever 116 is then shifted clockwise as viewed in Fig. 10 back to "Register" position, the release key 115 being held depressed during this time. This positions the stud 458 below the arm 457, said stud thereby blocking counter-clockwise movement as viewed in Figs. 10 and 19 of said segment 448, and consequently blocking movement of the shaft 456 (Fig. 19) out of the position in which it prevents initiation of a cycle of machine operation. The total control lever 116 may then be locked in the "Register" position by means of the lock 117.

When it is desired to permit operation of the machine once more, it is merely necessary to unlock the total control lever 116 and shift said lever counter-clockwise as viewed in Fig. 10 either to "Read Row 1" or "Reset Row 1" position. This shifts the stud 458 out of locking relationship with the arm 457 on the segment 448, and the slide 451 is then free to move clockwise as viewed in Fig. 19 under the influence of its spring, which frees the arm 455 and the shaft 456 to permit clockwise rotation thereof to initiate machine operation and also shifts the segment 448 in a counter-clockwise direction to return it to the position in which it is shown in Figs. 10 and 19.

Means are provided for shifting the #1 totalizer line 134 in response to movement of the total control lever 116 out of "Register" position. An arm 465 (Fig. 14) is secured to the shaft 286 which, it will be recalled, is rocked by shifting of the total control lever 116. At its lower end, said arm is provided with a stud 466 which cooperates with a slot 467 in an arm 468 free on a stud 475 on the right side frame 100. The slot 467 is formed with a notch 469 approximately midway of its length, and the stud 466 rests in the notch 469 when the total control lever 116 is "Register" position. A stud 470 is secured at the free end of the arm 468 in cooperative relation to a flat surface 471 on the manual shifting detent 164.

When the total control lever 116 is moved out of "Register" position to any other position, the arm 286 (Fig. 10), the shaft 285 and the arm 465 (Fig. 14) are shifted, thus moving the stud 466 out of alinement with the notch 469 in the arm 468 and causing said arm to be rocked in a clockwise direction as viewed in Fig. 14 about its pivot. This movement, through the cooperation of the stud 470 and the flat surface 471 on the shifting detent 164, shifts said detent a predetermined amount in a clockwise direction as viewed in Fig. 14, thereby shifting the #1 totalizer line 134 to aline the Group totalizer of said line with the primary differential members 126.

Movement of the total control lever 116 out of "Register" position also causes certain of the control keys to be locked against depression. Shifting of the detent 164 in the manner described above positions blocking surfaces 472 on said detent in the paths of movement of the studs 163 for the Amount Tendered key 103, the Tax Total key 107 and the Change-Balance Due key 108, thus preventing the depression of these keys when the total control lever 116 is not in "Register" position.

In addition, shifting the total control lever 116 to any of the "Read Row 2," "Reset Row 2 (—)," or "Reset Row 2 (+)" positions will also result in the Total key 105 being blocked against depression. It will be seen from Figs. 10 and 14 that shifting the total control lever 116 in a clockwise direction to any of the "Read Row 2," "Reset Row 2 (—)," or "Reset Row 2 (+)" positions causes counter-clockwise rotation of the arm 287, the shaft 286, and the arm 465. This shifts the stud 466 downward and to the right as viewed in Fig. 14, which causes it to coact with a camming surface 473 (Figs. 6 and 14) in an opening 474 in the detent 234, and thereby to shift said detent clockwise to position the upper surface of the finger 247 on the detent 234 in the path of movement of the stud 163 for the Total key 105 to prevent depression of said key.

*Control key interlocks*

The present machine is provided with control key interlock means to prevent use of certain of the control keys immediately following a machine operation initiated by certain others of said keys.

As shown in Fig. 17, the control keys 103 and 105 to 113 inclusive, as well as the Grocery Release key 104, are mounted for shifting movement in a key frame 480. A key retaining plate 481 is secured by means of screws 482 to the inner portion of the key frame 480, to retain the keys in their proper relative positions, and has mounted on the back side, as viewed in Fig. 17, a zero stop guide 488, for guiding movement of the zero stop bar 239. For a more detailed description of the construction of the keys and key frame, reference may be had to the previously mentioned application Serial No. 341,633, now Patent No. 2,880,930.

An operating detent 483 is shiftably mounted on the key frame 480 by means of two links, 484 and 485, and is provided with slots 486, each having a vertical portion and a curved portion, for coaction with the studs 163 of the control keys 103 and 105 to 113 inclusive, whereby depression of one of said keys will cause shifting of said detent in a counter-clockwise or downward direction, as viewed in Fig. 17. A stud 487 on the key retaining plate 481 serves to limit movement in a clockwise direction of the detent 483, and a stud 489 on the lower end of the detent 483 cooperates with mechanism which is not shown herein, but which is fully disclosed in the previously mentioned application Serial No. 341,633, now Patent No. 2,880,930, to initiate a cycle of machine operation.

A locking detent 490 is shiftably mounted on the operating detent 483 by means of two studs 491 in the detent 490, in cooperation with corresponding slots 492 in the detent 483, and is urged counter-clockwise with respect to the operating detent by a spring 493 tensioned between said detents. On its lower edge, the detent 490 is provided with a notch having a first step 494 and a second step 495, which are engageable in certain positions of the detent 490 by a tooth 496 on a pawl 497, pivotally mounted on the key retaining plate 481 and urged into engagement with the lower edge of the detent 490 by a spring 498. A retaining roller 499 on the pawl 497 is held between the key retaining plate 481 and a second plate 500, secured in spaced relation to the plate 481 by studs 501.

The detent 490 assumes the position in which it is shown in Fig. 17, following a total-taking operation initiated by depression of the Total key 105. In this position, a blocking surface 502 on a finger 503 on the detent 490 is positioned in the path of movement of the stud 163 for the Grocery key 106, in order to prevent inadvertent or erroneous depression of said Grocery key rather than the Amount Tendered key 103, which will customarily be used on a succeeding transaction.

In the event it is desired to utilize the Grocery key 106 subsequent to a total-taking operation, for an "add-on" Grocery item (as for example, where a customer belatedly remembers another item which he desires to purchase), the Grocery Release key 104 may be depressed, which will remove the blocking surface 502 from the path of movement of the stud 163 for the Grocery key 106, and permit depression of said key.

As may be seen in Figs. 1 and 17, the Grocery Release key 104 is smaller and of different shape than the control keys. It is in fact what might be termed a "dummy" key, and cannot initiate a cycle of operation of the machine. The stem of the key 104 is provided with an enlarged portion having a slot 504 therein, which cooperates with a stud 163 for the Meat key 109 to carry said stud, and consequently the Meat key 109, downwardly when the Grocery Release key 104 is depressed. The Grocery Release key is urged outwardly toward undepressed position by a spring 505, so that when the Meat key 109 is depressed, its stud 163 will ride downward freely in the slot 504 of the stem of the key 104, said key 104 being retained in undepressed position by the spring 505.

Downward movement of the key 104 is limited by a long narrow stud 506, secured on the stem of said key and formed to coact with the vertical portion of the corresponding slot 486 of the operating detent 483. Due to the shape of the stud 506, it cannot enter the curved portion of the slot 486, and it thus effectively limits the extent of downward movement of the key 104.

Depression of the key 104 causes the stud 163 of the Meat key 109 to be carried downwardly a distance corresponding to the permissible downward movement of the key 104, and to coact with a camming surface 507 on a finger 508 of the detent 490, to shift said detent in a clockwise direction, as viewed in Fig. 14, thus moving the blocking surface 502 on said detent out of the path of movement of the stud 163 for the Grocery key 106, and also moving the step 494 of the notch in said detent opposite the tooth 496 of the pawl 497, whereupon the tooth of said pawl will be moved into engagement with the step 494 by the spring 498 to retain the detent 490 in that position. The Grocery key 106 is then no longer blocked against depression and may be utilized any desired number of times.

It will be noted that if, after a total-taking operation during which the detent 490 is in the position in which it is shown in Fig. 17, it is desired to depress any of the itemizing keys 109 to 113 inclusive, this may be done without first depressing the Grocery Release key 104, since no blocking surfaces are formed on the detent 490 in the path of movement of the studs 163 for any of these keys. It will also be noted that depression of any of these keys, or of the Grocery key 106, will cause the detent 490 to be shifted clockwise a greater distance than is the case with depression of the Grocery Release key, since the studs 163 for these keys have a greater permissible inward movement, and will coact with the full extent of their corresponding camming surfaces on the detent 490. This will cause said detent to be shifted clockwise a sufficient distance to put the second step 495 of the notch in the detent 490 opposite the tooth 496 of the pawl 497, for engagement with said tooth, the tooth 496 being moved into engagement with the step 495 by the spring 498 to retain the detent 490 in said position.

The pawl 497 (Fig. 17) has a hook-shaped extension 509, which cooperates with a similar extension 510 on a slide 511. Depression of the Total key 105 causes the extension 510 on the slide 511 to engage the extension 509 on the pawl 497 and to carry said pawl in a clockwise direction, as viewed in Fig. 17, to disengage the tooth 496 of said pawl from whichever of the steps 494 or 495 it is engaged with, to free the detent 490 to the action of the spring 493, which immediately restores said detent to the position in which it is shown in Fig. 17. The mechanism by which this is accomplished is fully disclosed in previously mentioned application Serial No. 341,633, now Patent No. 2,880,930.

A camming surface 515 on a finger 516 of the detent 490 is formed to be positioned in the path of movement of the stud 163 for the Change-Balance Due key 108, when the detent 490 is positioned as shown in Fig. 17. Depression of the Change-Balance Due key 108 causes its stud 163 to coact with the cam surface 515 to shift the detent 490 clockwise a sufficient distance to put the step 494 of the notch in said detent opposite the tooth 496 of the pawl 497, for engagement with said tooth. It will be recalled that a Change or Balance Due operation is customarily the concluding operation in a multiple-item transaction, and the detent 490 is thus left in a position in which the Grocery key 106, as well as any of the other itemizing keys 109 to 113 inclusive, may be used to enter the first item of the next following multiple-item transaction.

A blocking surface 512 on the finger 508 of the detent 490 is formed to be positioned in the path of movement of the stud 163 for the Amount Tendered key 103 to block depression of said key whenever the detent 490 is so positioned that the tooth 496 of the pawl 497 is engaged with either of the two steps 494 or 495 of said detent. This makes mandatory a total-taking operation before the amount tendered by the customer can be entered into the machine.

A surface 513 on a finger 514 of the detent 490 is formed to be positioned in the path of movement of the stud 163 for the Change-Balance Due key 108 to block depression of said key whenever the detent 490 is so positioned that the tooth 496 of the pawl 497 is engaged with the step 495 of said detent. This prevents a Change or Balance Due operation immediately following an itemizing operation, so that the machine operator will be reminded to use the Total key 105 before using the key 108. It will be seen from Fig. 17 that the blocking surface 513 is formed so that use of the key 108 will be permitted when the step 494 of the detent 490 is engaged with the tooth 496 of the pawl 497. This construction is employed to permit two or more consecutive operations of the key 108. As has been previously explained, the key 108 may be used as a No Sale key in addition to its Change and Balance Due functions, and all consecutive operations of the key 108 after the first of the series are in effect No Sale operations.

*Operation*

It is believed that sufficient knowledge of the operation of the machine chosen to illustrate the present invention will have been obtained from a perusal of the preceding description, in connectnion with the drawings. Nevertheless, a brief statement of operation, using as a basis the receipt shown in Fig. 2 and the fragment of detail strip shown in Fig. 3, may prove helpful and will now be given. The machine chosen to illustrate the present invention is primarily an itemizing cash register, and one of several typical examples of the use of such a machine is in the checkout line of a self-service food market or similar business.

The receipt shown in Fig. 2 is the result of a multiple-item transaction, which comprises several item entering operations, including the entering of taxable and non-taxable items, a taxable total operation to ascertain the total amount of the taxable groceries, so that the tax in connection therewith may be computed and entered in the tax totalizer, a total operation to ascertain the total of the tax, plus all taxable and non-taxable items, a refund operation for entering the amount or amounts of refunds due to the customer from such things as bottle returns or special coupons, a second total operation which reflects the total of the purchases, plus tax less the refund, an amount tendered operation, which indicates the amount of money tendered by the customer to the cashier, in payment for the purchases, and a change or balance due operation, which indicates the amount of change due to the customer from the amount tendered, or conversely, the balance due to the cashier if the amount tendered was not sufficient to cover the total amount of the purchases. The data at the top of the receipt, shown in Fig. 2, including the statement "We Appreciate Your Patronage," the consecutive number "031," and the date "16 FEB 56," are printed at the end of the preceding operation, and form the heading for the receipt to be issued in the next succeeding operation.

First the operator makes sure that the total control lever 116 (Fig. 1) is in Register position, then depresses the proper clerks' key 114 (in this case "A"), and sets up the amount of the first item, which in this case is 32 cents, on the amount keys 102. Inasmuch as this first item is a nontaxable grocery item, the Grocery key 106 (Fig. 1) is depressed to initiate machine operation, and during this operation this key causes the amount to be added in the Plus side of the Balance totalizer on the No. 1 totalizer line 134, and in the Grocery totalizer on the No. 2 totalizer line 136. Also during this machine operation, the clerk's letter (A) and a symbol of the type of operation, "GROC," are printed on the first line of the receipt (Fig. 2), after which said receipt is line-spaced in preparation for the printing of the second item.

Next, the amount of the second item, 65 cents, is set up on the amount keys 102, and as this is for the purchase of meat, the Meat key 109 is depressed to initiate machine operation. During machine operation the amount of the meat item, the clerk's letter, and a symbol of the operation, "MEAT," are printed on the second line of the receipt, after which said receipt is line-spaced in preparation for the third item. The depression of the Meat key 109 also selects the Plus side of the Balance totalizer on the No. 1 line, and the Meat totalizer on the No. 2 line, and during machine operation, the amount of the meat item is added in these two totalizers.

Next, the amount of the third item, 44 cents, is set up on the amount keys, and as this is for the purchase of a taxable item, the Tax Items key 111 is depressed to initiate machine operation, during which operation the amount of the tax item is added in the Taxable Itemizing totalizer on the No. 1 totalizer line, and in the Grocery totalizer on the No. 2 line. Also during machine operation, the amount of the taxable item, the clerk's letter, and an identifying symbol, "TAX ITEM," are printed on the third line of the receipt (Fig. 2), after which said receipt is line-spaced in preparation for the fourth item.

The amount of the fourth item, 64 cents, is set up on the amount keys, and as this is for the purchase of produce, the Produce key 110 is depressed to initiate machine operation. During machine operation the amount of the Produce item, the clerk's letter (A), and a symbol of the operation, "PROD," are printed on the fourth line of the receipt, after which said receipt is line-spaced in preparation for the fifth item. The depression of the Produce key 110 also selects the Plus side of the Balance totalizer on the No. 1 line, and the Produce totalizer on the No. 2 line, and during machine operation the amount of the Produce item is added in these two totalizers.

The amount of the fifth item, $1.52, is set up on the amount keys, and inasmuch as this is for the purchase of meat, the Meat key 109 is depressed to initiate machine operation. During machine operation the amount of the meat item, the clerk's letter, and a symbol of the operation, "MEAT," are printed on the fifth line of the receipt, after which said receipt is line-spaced in preparation for the sixth item. The depression of the "Meat" key 109 also selects the Plus side of the Balance totalizer on the No. 1 line, and the "Meat" totalizer on the No. 2 line, and during the machine operation, the amount of the meat item is added in these two totalizers.

The amount of the six item, 32 cents, is set up on the amount keys, and inasmuch as this is a taxable grocery item, the Tax Items key 111 is depressed to initiate machine operation. The Tax Items key selects the Taxable Itemizing totalizer on the No. 1 line and the Grocery totalizer on the No. 2 line for addition, and during machine operation the amount of the taxable item is added in these two totalizers. Also during machine operation, the amount of the taxable item, the clerk's letter, and a symbol "TAX ITEM" are printed on the sixth line of the receipt, after which said receipt is line-spaced in preparation for the next operation. Inasmuch as there are no more items to be entered in this multiple-item transaction, the operator depresses the Tax Total key 107 to initiate a Tax Total operation during which the Taxable Itemizing totalizer is cleared, and in a transfer total operation, as explained in the previously mentioned application Serial No. 412,464, the amount of the taxable total is added in the Plus side of the Balance totalizer of the No. 1 totalizer line, during the latter part of the Tax Total operation. It will be noted by referring to Fig. 2 that the amount of the Taxable Total is not printed upon the receipt, but is set up on the amount indicators only, and as these indicators remain in set position at the end of the Taxable Total operation, the operator may ascertain from them the amount of the tax on the Taxable Total, which tax in this case is three cents. The amount of the tax, three cents, is then set up on the amount keys, after which the Tax key 112 is depressed to initiate a tax operation, during which the amount of the tax is added in the Plus side of the Balance totalizer on the No. 1 line, and in the Tax totalizer on the No. 2 line. Also, during the tax operation, the amount of the tax, the clerk's letter, and the symbol, "TAX," are printed on the seventh line of the receipt (Fig. 2), after which said receipt is line spaced in preparation for the next operation.

The Total key 105 is now depressed to initiate a sub-total operation, during which the amount, $3.92, standing on the Plus side of the Balance totalizer of the No. 1 totalizer line, is set up on the amount indicators and printed on the receipt in the eighth line, as shown in Fig. 2, together with the clerk's letter, and a symbol "TOTL," after which the receipt is line-spaced in preparation for the next operation. As is described in the previously mentioned application Serial No. 341,633, now Patent No. 2,880,930, during a sub-total operation, the amount standing on the wheels of the selected totalizer is first cleared therefrom in the positioning of the primary differential members, and then is reentered on said totalizer wheels, so that further computations may be carried on in connection therewith.

The amount of a refund item, that is, an amount which is due to the customer from the store, and which may consist of such things as returned bottles, special discount coupons, etc., and which in this case is 12 cents, is next set up on the amount keys, and the Refund key 113 is depressed to initiate machine operation. The Refund key 113 selects the Minus side of the Balance totalizer of the No. 1 totalizer line, and the Refund totalizer on the No. 2 line for addition, and during the machine operation, the amount of the refund is added in these two totalizers. Since the Plus and Minus sides of the Balance totalizer are coupled for reverse rotation, addition into the Minus side has the effect of subtraction from the Plus side, as has been previously explained. Also during machine operation, the amount of the refund, clerk's letter, and a symbol "REFUND," are printed on the ninth line of the receipt, after which said receipt is line-spaced in preparation for the next operation.

The Total key 105 is then depressed to initiate a second sub-total operation. As has been previously explained, either the Plus or the Minus side of the Balance totalizer may be selected to be read, depending upon the condition of the totalizer selecting mechanism. In the present example, the Plus side is selected, and the amount $3.80 standing thereon is set up on the amount indicators and printed on the receipt in the tenth line, as shown in Fig. 2, together with the clerk's letter, and a symbol "TOTL," after which the receipt is line-spaced in preparation for the next operation. The amount $3.80 standing on the wheels of the selected totalizer is first cleared therefrom to condition the printing and indicating mechanism, and is then re-entered thereon. The amount $3.80 set up on the indicators and printed on the receipt in this operation is the actual net amount due from the customer for the complete transaction.

It will be recalled that depressing the Total key 105 unlocks the Amount Tendered key 103, and an amount of $5.00 tendered by the customer in this case in payment is next set up on the amount keys and the Amount Tendered key 103 is depressed to initiate machine operation. The Amount Tendered key selects the Minus side of the Balance totalizer for addition, and during machine operation, the amount tendered is added in this totalizer. Since the Plus and Minus sides of the Balance totalizer are geared for reverse rotation, addition into the Minus side has the effect of subtracting from the Plus side, as has been previously explained. Also, during machine operation, the amount tendered, the clerk's letter, and a symbol "AMT TEND" are printed on the eleventh line of the receipt, after which said receipt is double-line spaced in preparation for the final operation.

The operator depresses the Change-Balance Due key 108 to initiate the final operation of a multiple-item transaction. As has been previously explained, either the Plus side or the Minus side of the Balance totalizer may be selected for this operation, depending upon the condition of the totalizer selecting mechanism. In the present example, the amount tendered of $5.00, which was entered on the Minus side exceeds the net total of $3.80, which was entered on the Plus side, and therefore the Minus side is selected, and the amount $1.20 standing thereon is set up on the amount indicators and printed on the receipt on the last line, as shown in Fig. 2, together with the clerk's letter, and a symbol "CHNG." The amount $1.20 standing on the wheels of the Minus side is cleared therefrom in positioning of the primary differential members, said wheels thereby being reset to zero, and the complementary wheels of the Plus side all being set at 9. Since this is the last operation of this transaction, the Plus and Minus sides of the Balance totalizer are left in their reset condition, and the amount $1.20 is not reentered thereon. Also during this operation, the information "Your Receipt Thank You" is printed near the bottom edge of the receipt, after which said receipt is fed outwardly the proper extent in relation to a tearing blade in the machine cabinet, so that said receipt may be severed from the web of the receipt material.

It should be noted in connection with the above description of a typical multiple-item transaction that the present machine is equipped with indicating means for describing the type of transaction, as well as amount indicating means. In each of the above described operations of the machine during the multiple-item transaction, the symbol which is printed on the receipt in connection with each operation is also indicated by the transaction indicators on the machine during that operation.

The present machine is provided with a detail strip, a fragment of which is shown in Fig. 3. In the illustrated embodiment, only Tax Total, Total, Amount Tendered, and Change or Balance Due operations are recorded on the detail strip. If desired, the detail strip printing control mechanism may be adjusted so that it will record other operations, such as itemizing operations, of the machine, in accordance with the particular requirements of the business system in which the machine is used.

At the close of the business day, or at any other suitable interval, a balance may be taken of the day's transactions for comparison with the funds physically present in the cash drawer of the cash register.

The first step in performing this balancing operation is to shift the total control lever 116 (Fig. 1) to "Reset Row 2 (+)" position. All of the positive department totals on the No. 2 totalizer line, consisting of Tax, Grocery and Taxable Items, Produce, and Meat are then accumulated in the Group totalizer of the No. 1 totalizer line by reset operations, through depression of their appropriate transaction keys 106, 109, 110 and 112, respectively. This brings the Group totalizer to a "current" status, and resets all of the positive itemizing totalizers of the No. 2 totalizer line.

The total control lever 116 is then shifted to "Reset Row 1" position, and the Total key 105 is depressed to initiate a machine operation in which the total of the Group totalizer is indicated and printed by the machine, and in which the Group totalizer will be reset to zero. In the event it is desired to keep a running total of the Group totalizer over a period covering a number of business days, the "Read Row 1" rather than "Reset Row 1" position of the total control lever 116 may be used, in which case the amount on the Group totalizer will be re-entered thereon and the totalizer will not be reset to zero. The total for the day may then be computed by manually subtracting the total at the end of the previous day from the total at the end of the current day.

The total control lever 116 is then shifted to its "Reset Row 2 (—)" position and the Refund key 113 is depressed to initiate a machine operation in which the total of the Refund totalizer of the No. 2 totalizer line is indicated and printed by the machine, and in which the Refund totalizer is reset to zero.

The Refund total may then be manually subtracted from the "Read Row 1" total in order to give the actual balance, which should be equal to the funds present in the cash drawer of the cash register. It will be seen that a simple, effective means has thus been provided for determination of the amount of the receipts for the business day, or such other period as may have been selected.

While the form of mechanism herein shown and described is admirably adapted to fulfill the objects primarily stated, it is to be understood that it is not intended to confine the invention to the form or embodiment herein disclosed, for it is susceptible of embodiment in various other forms, all coming within the spirit and scope of the invention.

What is claimed is:

1. In a machine capable of indicating, registering, and recording multiple-item transactions including both positive and negative amount items, sub-totals of said items, and the amount tendered by the customer, and also capable of computing, indicating, and registering the change or balance due from the amount of the sub-total and the amount tendered, the combination of machine-releasing mechanism; a balance totalizer having a plus side and a minus side interconnected for reverse rotation; means including amount actuators to enter values into and take values out of the balance totalizer; a plurality of control keys to select the plus side of said totalizer for engagement with the amount actuators; a control key to select the minus side of said totalizer for engagement with the amount actuators; a total key to take a sub-total of the positive and negative items entered into said totalizer during a muliple-item transaction; an amount tendered key to select the minus side of said totalizer to cause the amount tendered to be entered into the minus side of the totalizer for computation of the change due the customer or the balance owed by the customer as the case may be; a change-balance due key to cause the amount of change or the balance due to be indicated and recorded; means for sensing the algebraic condition of the balance totalizer; means including a first detent controlled by the change-balance due key and also including a second detent controlled by said sensing means and by the change-balance due key and operable to co-act with said first detent for selecting the proper side of the balance totalizer to cause the correct change or balance due to be indicated and recorded; and means operated by depression of any of said keys to operate the machine-releasing mechanism.

2. In a machine capable of indicating, registering, and recording multiple-item transactions including both positive and negative amount items, sub-totals of said items, and the amount tendered by the customer, and also capable of computing, indicating, and recording the change or balance due from the amount of the sub-total and the amount tendered, the combination of machine-releasing mechanism; a balance totalizer having a plus side and a minus side interconnected for reverse rotation; means including amount actuators to enter values into and take values out of the balance totalizer; means to select the plus side of said totalizer for engagement with the amount actuators; means to select the minus side of said totalizer for engagement with the amount actuators; means to take a sub-total of the positive and negative items entered into said totalizer during a multiple-item transaction means including an amount tendered key to select the minus side of said totalizer to cause the amount tendered to be entered into the minus side of the totalizer for computation of the change due the customer or the balance owed by the customer as the case may be; means including a change-balance due key to cause the amount of change or the balance due to be indicated and recorded; means for sensing the algebraic condition of the balance totalizer; means including a first detent controlled by the change-balance due key and also including a second detent controlled by said sensing means and by the change-balance due key and operable to coact with said first detent for selecting the proper side of the balance totalizer to cause the correct change or balance due to be indicated and recorded; means operated by any of the selecting means, the sub-total taking means and by depression of any of said keys to operate the machine-releasing mechanism; and means for preventing operation of the amount tendered key until after a sub-total operation has taken place.

3. In a machine capable of indicating, registering, and recording multiple-item transactions including both positive and negative amount items, sub-totals of said items, and the amount tendered by the customer, and also capable of computing, indicating, and recording the change or balance due from the amount of the sub-total and the amount tendered, the combination of machine-releasing mechanism; a balance totalizer having a plus side and a minus side interconnected for reverse rotation; means including amount actuators to enter values into and take values out of the balance totalizer; a plurality of control keys, including a special item key, to select the plus side of said totalizer for engagement with the amount actuators; a control key to select the minus side of said totalizer for engagement with the amount actuators; a total key to cause a sub-total to be taken of the positive and negative items entered in said totalizer during a muliple-item transaction; an amount tendered key to cause the minus side of said totalizer to be selected to cause the amount tendered to be entered into the minus side of the totalizer for computation of the change due or the balance owed as the case may be; a change-balance due key to cause the amount of change for the balance due to be indicated and recorded; means for sensing the algebraic condition of the balance totalizer; means including a first detent controlled by the change-balance due key and also including a second detent controlled by said sensing means and by the change-balance due key and operable to coact with said first detent for selecting the proper side of the balance totalizer to cause the correct change or balance due to be indicated and recorded; means operated by depression of any of said keys to operate the machine-releasing mechanism; and means to prevent operation of the special item key following operation of the total key.

4. In a machine capable of indicating, registering, and recording multiple-item transactions including both positive and negative amount items, sub-totals of said items, and the amount tendered by the customer, and also capable of computing, indicating, and recording change or balance due from the amount of the sub-total and the amount tendered, the combination of machine-releasing mechanism; a balance totalizer having a plus side and a minus side interconnected for reverse rotation; means including amount actuators to enter values into and take values out of the balance totalizer; a plurality of control keys including a special item key to select the plus side of said totalizer for engagement with the amount actuators; a control key to select the minus side of said totalizer for engagement with the amount actuators; a total key to effect the taking of a sub-total of the positive and negative items entered in said totalizer during a multiple-item transaction; an amount tendered key to select the minus side of said totalizer to cause the amount tendered to be entered into the minus side of the totalizer for computation of the change due or the balance owed as the case may be; a change-balance due key to cause the amount of change or the balance due to be indicated and recorded; means for sensing the algebraic condition of the balance totalizer; means including a first detent controlled by the change-balance due key and also including a second detent controlled by said sensing means and by the change-balance due key and operable to coact with said first detent for selecting the proper side of the balance totalizer to cause the correct change or balance due to be indicated and recorded; means operated by depression of any of said keys to operate the machine-releasing mechanism; means for preventing operation of the special item key after a total operation; and means including a special item release key for rendering said preventing means ineffective.

5. In a machine of the class described, constructed and arranged to perform multiple-item transactions, including both positive and negative amount items, and a final net total operation, the combination of a balance totalizer including a plus side to accumulate positive items, a minus side to accumulate negative items, and means interconnecting the two sides to cause each additive entry on one side to effect a corresponding subtraction from the other side; means to determine the amounts to be entered into the plus side or the minus side of said totalizer; a plurality of control keys for initiating positive and negative itemizing operations; a total key for initiating a total-taking operation; a totalizer shifting detent positioned in operative relation to said total key for coaction therewith to select the proper side of the balance totalizer in a total-taking operation; a control detent shiftable between a first position and a second position in which it is positioned in the path of movement of the total key to be shifted by depression of the total key to shift the totalizer shifting detent to cause the totalizer shifting detent to select the minus side of the balance totalizer upon depression of the total key; means on the totalizer shifting detent to cause said totalizer shifting detent to select the plus side of the balance totalizer upon depression of the total key when the control detent is in its first position; and means responsive to an overdraft of the balance totalizer for shifting the control detent from one of said positions to the other.

6. In a machine of the class described, constructed and arranged to perform multiple-item transactions, including both positive and negative amount items, and a final net total operation, the combination of a balance totalizer including a plus side to accumulate positive items, a minus side to accumulate negative items, and means interconnecting the two sides to cause each additive entry on one side to effect a corresponding subtraction from the other side; means to determine the amounts to be entered into the plus side or the minus side of said totalizer; a plurality of control keys for initiating positive and negative itemizing operations; a total key for initiating a total-taking operation; a totalizer shifting detent positioned in operative relation to said total key for coaction therewith to select the proper side of the balance totalizer in a total-taking operation; a control detent shiftable between a first position and a second position in which it is positioned in the path of movement of the total key to be shifted by depression of the total key to shift the totalizer shifting detent to cause the totalizer shifting detent to select the minus side of the balance totalizer upon depression of the total key; means on the totalizer shifting detent to cause the totalizer shifting detent to select the plus side of the balance totalizer upon depression of the total key when the control detent is in its first position; shifting means operable to shift the control detent from one of said positions to the other; control means responsive to an overdraft of the balance totalizer for operating said shifting means; and means operating in regularly excursioned movement during each cycle of machine operation for driving said control means.

References Cited in the file of this patent

UNITED STATES PATENTS

| | | |
|---|---|---|
| 2,106,273 | Fleming | Jan. 25, 1938 |
| 2,167,714 | Goldberg | Aug. 1, 1939 |
| 2,203,336 | Landsiedel | June 4, 1940 |
| 2,279,858 | Breitling et al. | Apr. 14, 1942 |
| 2,284,886 | Vigborg et al. | June 2, 1942 |
| 2,302,422 | Crouse | Nov. 17, 1942 |
| 2,306,894 | Nelson | Dec. 29, 1942 |
| 2,353,938 | Spurlino et al. | July 18, 1944 |
| 2,387,554 | Aurbach | Oct. 23, 1945 |
| 2,626,749 | Christian et al. | Jan. 27, 1953 |
| 2,682,994 | Boyden et al. | July 6, 1954 |
| 2,695,134 | Sundstrand | Nov. 23, 1954 |
| 2,698,139 | Goodbar et al. | Dec. 28, 1954 |

UNITED STATES PATENT OFFICE
CERTIFICATION OF CORRECTION

Patent No. 2,974,860                      March 14, 1961

Frank R. Werner et al.

It is hereby certified that error appears in the above numbered patent requiring correction and that the said Letters Patent should read as corrected below.

Column 18, lines 6 and 7, strike out "the restoring rod 335 are engaged by slots in the upper ends of companion arms 342 and 343 (Figs. 4 and "; line 23, for "is" read -- in --; column 19, line 24, for "in" read -- is --; column 24, line 70, for "on", second occurrence, read -- of --; column 26, line 52, for "connectnion" read -- connection --; column 28, line 26, for "in", second occurrence, read -- is --.

Signed and sealed this 8th day of August 1961.

(SEAL)
Attest:

ERNEST W. SWIDER
Attesting Officer

DAVID L. LADD
Commissioner of Patents